(12) United States Patent
Okamura

(10) Patent No.: US 11,036,833 B2
(45) Date of Patent: Jun. 15, 2021

(54) IMAGE PROCESSING SYSTEM, INFORMATION PROCESSING METHOD, AND NON-TRANSITORY COMPUTER-READABLE MEDIUM

(71) Applicant: Takao Okamura, Tokyo (JP)

(72) Inventor: Takao Okamura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 398 days.

(21) Appl. No.: 15/634,160

(22) Filed: Jun. 27, 2017

(65) Prior Publication Data

US 2018/0011998 A1 Jan. 11, 2018

(30) Foreign Application Priority Data

Jul. 11, 2016 (JP) .............................. JP2016-136971
May 12, 2017 (JP) .............................. JP2017-095658

(51) Int. Cl.
*G06F 21/00* (2013.01)
*G06F 21/16* (2013.01)
(Continued)

(52) U.S. Cl.
CPC ............ *G06F 21/16* (2013.01); *G06F 3/0481* (2013.01); *G06F 3/04847* (2013.01);
(Continued)

(58) Field of Classification Search
CPC .. G06F 21/16; G06F 21/6209; G06F 3/04847; G06F 3/0481; G06F 2221/0733; G06F 2221/0737; H04N 1/32
See application file for complete search history.

(56) References Cited

U.S. PATENT DOCUMENTS 6,972,856 B1 * 12/2005 Takahashi .......... H04N 1/00244
358/1.14
7,363,278 B2 * 4/2008 Schmelzer .............. G06F 21/10
705/67
(Continued)

FOREIGN PATENT DOCUMENTS

JP 2008-217658 A 9/2008
JP 2009-141700 6/2009
(Continued)

OTHER PUBLICATIONS

Zhao et al., "Dual domain watermarking for authentication and compression of cultural heritage images", IEEE Transactions on Image Processing, vol. 13, Issue: 3, Mar. 2004.*
(Continued)

*Primary Examiner* — Morshed Mehedi
(74) *Attorney, Agent, or Firm* — Harness, Dickey & Pierce, P.L.C.

(57) ABSTRACT

An image processing system includes circuitry. The circuitry accepts, from a user, an input of information to be registered. The circuitry registers the inputted information as registered information. The circuitry generates tracing data to be used for tracing the registered information. The circuitry outputs the tracing data. The circuitry associates access authorization to an access log for the registered information with the tracing data. The circuitry accepts an input of the tracing data. The circuitry acquires the access log that is associated with the inputted tracing data, and displays the acquired access log.

20 Claims, 38 Drawing Sheets

(51) Int. Cl.
*G06F 3/0484* (2013.01)
*G06F 21/62* (2013.01)
*G06F 3/0481* (2013.01)

(52) U.S. Cl.
CPC .. *G06F 21/6209* (2013.01); *G06F 2221/0733* (2013.01); *G06F 2221/0737* (2013.01)

(56) References Cited

U.S. PATENT DOCUMENTS

| | | | | |
|---|---|---|---|---|
| 8,234,496 | B1* | 7/2012 | Ding | G06F 21/16 |
| | | | | 713/176 |
| 8,417,966 | B1* | 4/2013 | Mooneyham | H04L 9/3236 |
| | | | | 713/189 |
| 8,677,132 | B1* | 3/2014 | Liao | H04L 9/3226 |
| | | | | 713/176 |
| 2001/0012410 | A1 | 8/2001 | Michiie et al. | |
| 2002/0002413 | A1* | 1/2002 | Tokue | G06F 21/10 |
| | | | | 700/94 |
| 2002/0040415 | A1 | 4/2002 | Moteki et al. | |
| 2003/0011821 | A1 | 1/2003 | Obata et al. | |
| 2003/0132942 | A1 | 7/2003 | Obata et al. | |
| 2004/0109186 | A1 | 6/2004 | Shindoh et al. | |
| 2004/0114171 | A1 | 6/2004 | Shindoh et al. | |
| 2004/0125415 | A1 | 7/2004 | Michiie et al. | |
| 2004/0136022 | A1 | 7/2004 | Kizaki et al. | |
| 2004/0136032 | A1 | 7/2004 | Kizaki et al. | |
| 2005/0169499 | A1* | 8/2005 | Rodriguez | H04N 1/32144 |
| | | | | 382/100 |
| 2006/0050994 | A1 | 3/2006 | Michiie et al. | |
| 2007/0236749 | A1* | 10/2007 | Henry | H04N 1/00214 |
| | | | | 358/402 |
| 2008/0037825 | A1* | 2/2008 | Lofgren | G06F 16/58 |
| | | | | 382/100 |
| 2008/0049971 | A1* | 2/2008 | Ramos | H04N 1/32144 |
| | | | | 382/100 |
| 2008/0141379 | A1* | 6/2008 | Schmelzer | G06F 21/10 |
| | | | | 726/26 |
| 2008/0301792 | A1* | 12/2008 | Hong | G07C 9/23 |
| | | | | 726/9 |
| 2009/0110231 | A1* | 4/2009 | Rzeszewski | G06T 1/0028 |
| | | | | 382/100 |
| 2009/0147292 | A1 | 6/2009 | Shimura et al. | |
| 2010/0034551 | A1 | 2/2010 | Okamura et al. | |
| 2010/0321739 | A1* | 12/2010 | Amagai | G06T 3/00 |
| | | | | 358/3.28 |
| 2015/0215492 | A1* | 7/2015 | De Vuono | G06T 1/0042 |
| | | | | 382/100 |

FOREIGN PATENT DOCUMENTS

| | | |
|---|---|---|
| JP | 2009-282811 A | 12/2009 |
| JP | 2012-182646 | 9/2012 |
| JP | 2015-158724 A | 9/2015 |

OTHER PUBLICATIONS

Japanese Office Action dated Dec. 15, 2020.

* cited by examiner

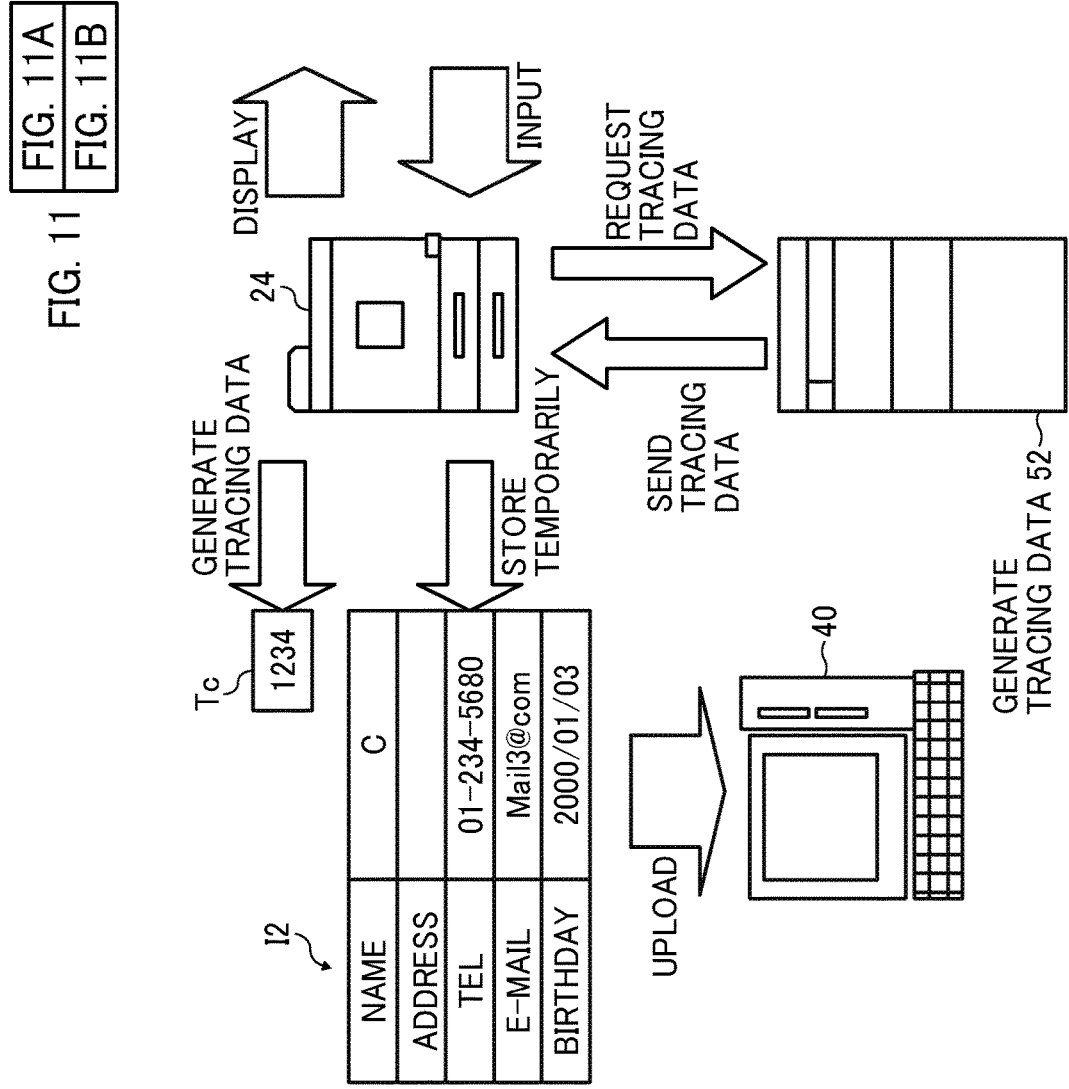

STORE INFORMATION IN 003
TABLE THAT IS VACANT

DATA TABLE T1

| No. | NAME | ADDRESS | TEL | Email | BIRTHDAY |
|-----|------|---------|------|-------|----------|
| 001 | A | | 01-234-5678 | mail1@com | 2000/01/01 |
| 002 | B | | 01-234-5679 | mail2@com | 2000/01/02 |
| 003 | C | | 01-234-5680 | mail3@com | 2000/01/03 |
| 004 | D | | 01-234-5681 | mail4@com | 2000/01/04 |
| 005 | E | | 01-234-5682 | mail5@com | 2000/01/05 |
| 006 | F | | 01-234-5683 | mail6@com | 2000/01/06 |

ASSOCIATE WITH ACCESS LOG TABLE

FIG. 12B

ACCESS LOG TABLE T2

| No. | TRACING DATA | NUMBER OF PRINTING | NUMBER OF EDITS | NUMBER OF COPYING | NUMBER OF REFERENCES | NUMBER OF DOWNLOADS |
|---|---|---|---|---|---|---|
| 001 | 0000 | 0 | 0 | 0 | 1 | 0 |
| 002 | 9999 | 1 | 0 | 0 | 3 | 1 |
| 003 | 1234 | 0 | 0 | 0 | 0 | 0 |
| 004 | 5678 | 0 | 0 | 0 | 2 | 2 |
| 005 | 2468 | 0 | 1 | 0 | 1 | 1 |
| 006 | 1357 | 2 | 0 | 0 | 1 | 0 |

ACCESS LOG MANAGEMENT AUTHORIZATION TABLE T3

| No. | ACCESS AUTHORIZATION | TRACING DATA |
|---|---|---|
| 001 | NO | 0 |
| 002 | NO | 0 |
| 003 | REFERENCE/ DOWNLOAD | 1234 |
| 004 | NO | 0 |
| 005 | NO | 0 |
| 006 | NO | 0 |

ASSOCIATE WITH ACCESS AUTHORIZATION FOR ACCESSING LOG TABLE
ASSIGN ACCESS AUTHORIZATION FOR ACCESSING LOG OF REGISTERED DATA

FIG. 12C

DOWNLOAD MANAGEMENT TABLE                                  T4

| ACCESS LOG TABLE NO. | DATE OF DOWNLOAD | PERSON WHO DOWNLOADED |
|---|---|---|
| 002 | 2015/01/02 | A |
| 004 | 2015/02/03 | GUEST |
| 004 | 2015/03/04 | B |
| 005 | 2015/01/15 | ADMINISTRATOR |

FIG. 13

| FIG. 13A |
|---|
| FIG. 13B |
| FIG. 13C |
| FIG. 13D |

FIG. 13A

TRACE TABLE — T5

| No. | TRACING DATA | ACCESS DESTINATION |
|---|---|---|
| 001 | 1234 | 01.02.03.04 |
| 002 | 5678 | http://abc.com |
| 003 | 9999 | http://xyz.com |
| 004 | 2468 | http://aaa.com |
| 005 | 1357 | http://bbb.com |
| 006 | ... | ... |

TRACING APPARATUS 52

DATABASE 40

IMAGE DATA IN WHICH TRACING DATA "1234" IS DIGITALLY EMBEDDED

J1: 2015/12/12 XXX QUESTIONNAIRE PERSONAL DATA ACCESS

USER

FIG. 20

ABC 2015/12/12 QUESTIONNAIRE INFORMATION

ABC CORPORATION QUESTIONNAIRE INPUT

| NAME | C |
|---|---|
| ADDRESS | |
| TEL | 01-234-5680 |
| E-MAIL | Mail3@com |
| BIRTHDAY | 2000/01/03 |

UPLOAD DESTINATION

| REGISTRATION DESTINATION | ABC |
|---|---|
| INTERNAL SETTING | INTERNAL DATABASE |
| EXTERNAL REGISTRATION DESTINATION | HEADQUARTER MANAGEMENT |
| MANUAL | (PLEASE ENTER) |

OUTPUT OF SHEET FOR ACCESSING ACCESS LOG   ON   OFF

WHEN YOU FINISH FILLING OUT QUESTIONNAIRE,
PLEASE PRESS "CONTINUE" TO UPLOAD QUESTIONNAIRE ( ENTER )  ( CANCEL )  ( CONTINUE )

LIST  THUMBNAIL

DELETE
EDIT
REFER

CLOSE

1/1  ◀ ▶

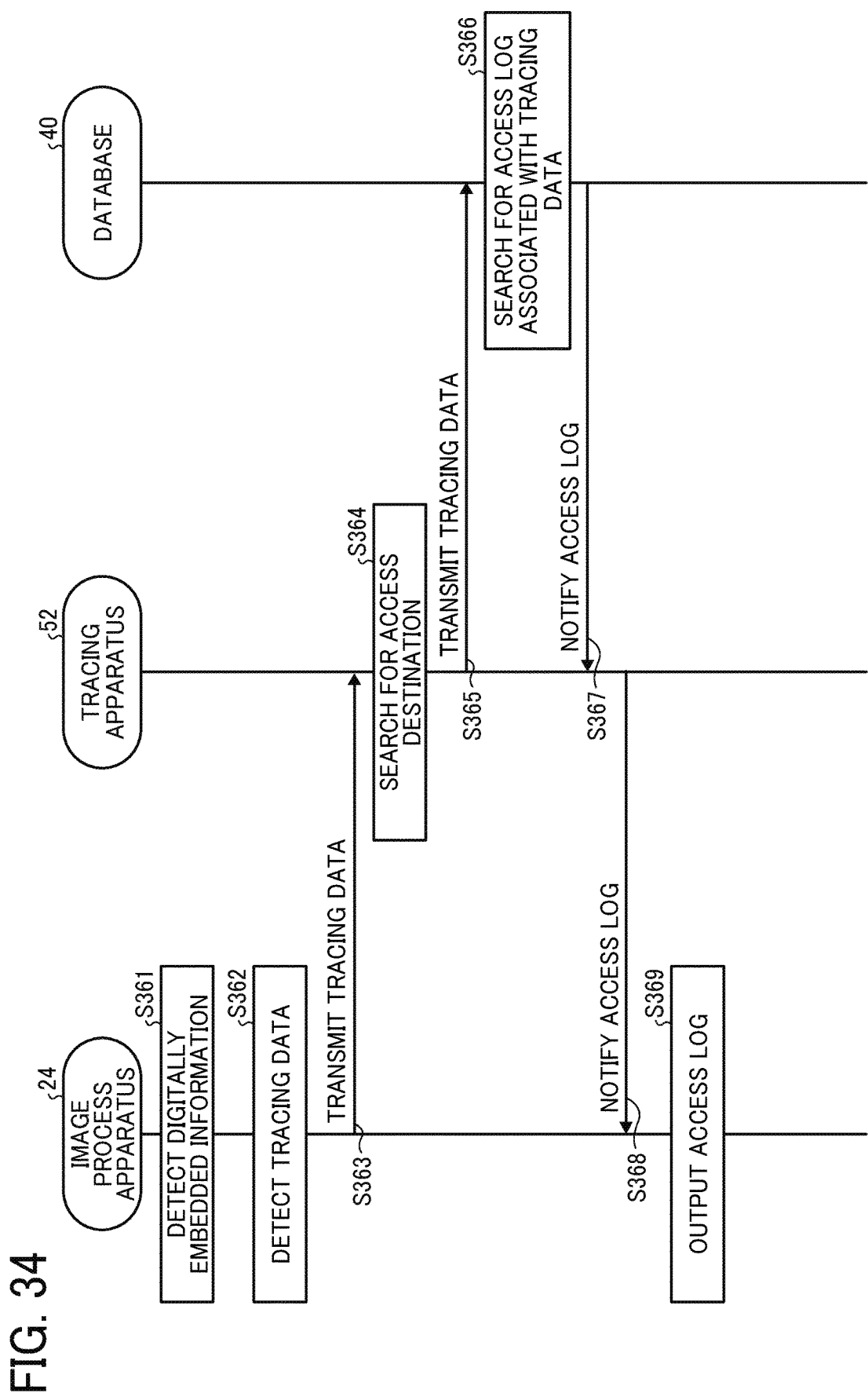

IMAGE PROCESSING SYSTEM, INFORMATION PROCESSING METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application Nos. 2016-136971, filed on Jul. 11, 2016 and 2017-095658, filed on May 12, 2017 in the Japan Patent Office, the entire disclosures of which are hereby incorporated by reference herein.

BACKGROUND

Technical Field

The present disclosure relates to an image processing system, an information processing method, and a non-transitory computer-readable medium.

Description of the Related Art

A technique is known that embeds a digital watermark in electronic data and traces the embedded digital watermark on the Internet to detect whether the electronic data have been leaked.

SUMMARY

An image processing system includes circuitry. The circuitry accepts, from a user, an input of information to be registered. The circuitry registers the inputted information as registered information. The circuitry generates tracing data to be used for tracing the registered information. The circuitry outputs the tracing data. The circuitry associates access authorization to an access log for the registered information with the tracing data. The circuitry accepts an input of the tracing data. The circuitry acquires the access log that is associated with the inputted tracing data, and displays the acquired access log.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 11A and 11B illustrate a data registration process performed by the image processing system according to an embodiment of the present disclosure;

FIGS. 12A to 12C illustrate an example of a data configuration according to an embodiment of the present disclosure;

FIGS. 13A to 13D illustrate an overview of access log acquisition processing performed by the image processing apparatus, the tracing apparatus, and the database according to an embodiment of the present disclosure;

FIG. 20 is a view illustrating an example of an information input screen according to an embodiment of the present disclosure;

FIG. 34 is a sequence diagram illustrating information flows in an access log acquisition between the image processing apparatus, the database and the tracing apparatus according to an embodiment of the present disclosure.

Figure 1:
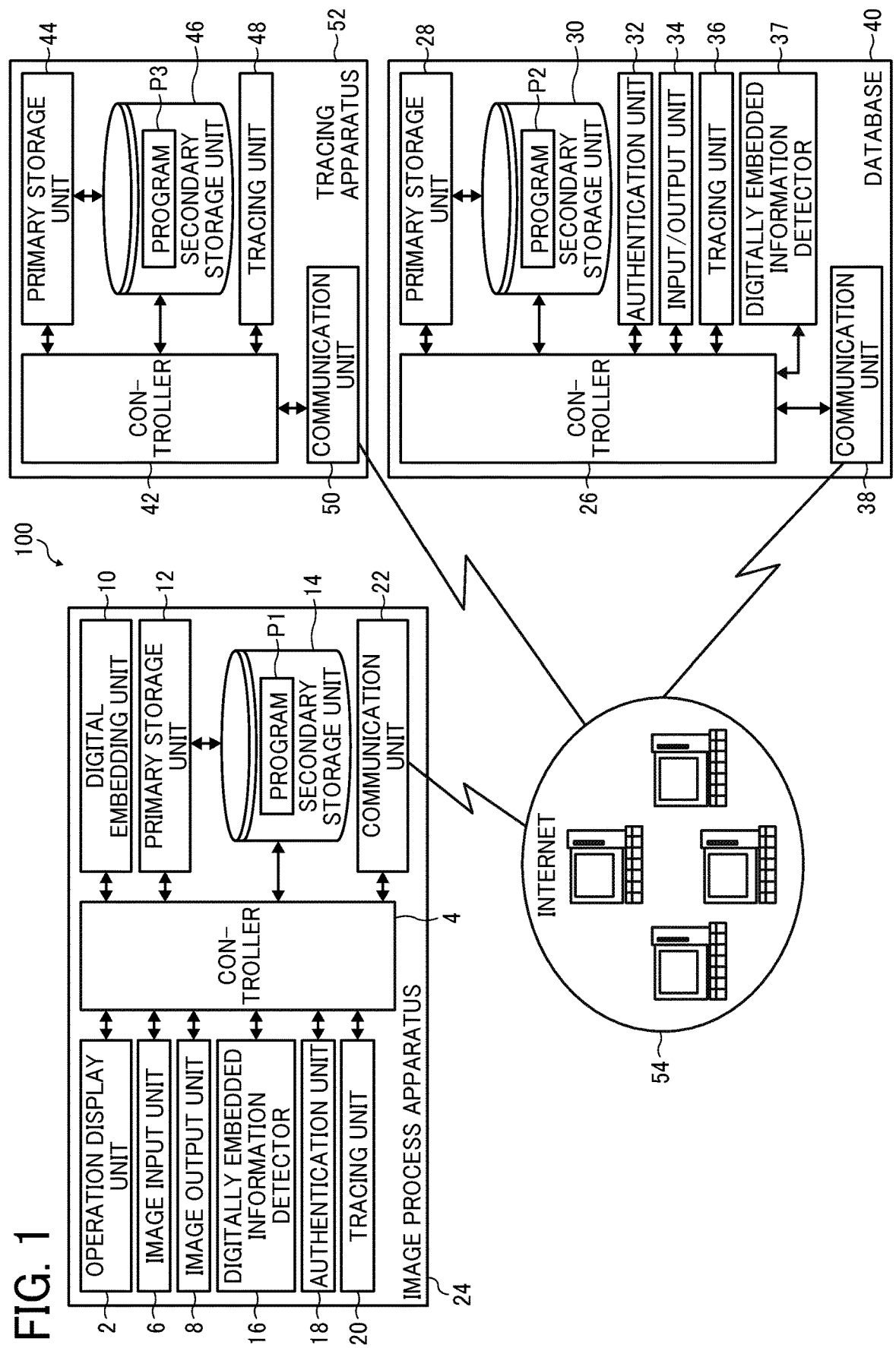
FIG. 1 is a schematic block diagram illustrating a configuration of an image processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of an image processing system according to an embodiment of the present disclosure.

FIG. 1 is a schematic block diagram illustrating a configuration of an image processing system 100 according to an embodiment of the present disclosure. As illustrated in FIG. 1, the image processing system 100 includes an image processing apparatus 24, a database 40, a tracing apparatus 52, and an Internet 54.

First, a description is given of the image processing apparatus 24.

The image processing apparatus 24 reads in personal information that is input by a user, and generates tracing data to track an access status to the read information. Examples of the personal information that is input by the user include the user's response to a questionnaire. The image processing apparatus 24 embeds the generated tracing data as digital information such as a digital watermark. As illustrated in FIG. 1, the image processing apparatus 24 includes an operation display unit 2, a controller 4, an image input unit 6, an image output unit 8, a digital embedding unit 10, a primary storage unit 12, a secondary storage unit 14, a digitally embedded information detector 16, an authentication unit 18, a tracing unit 20, and a communication unit 22.

Figure 2:
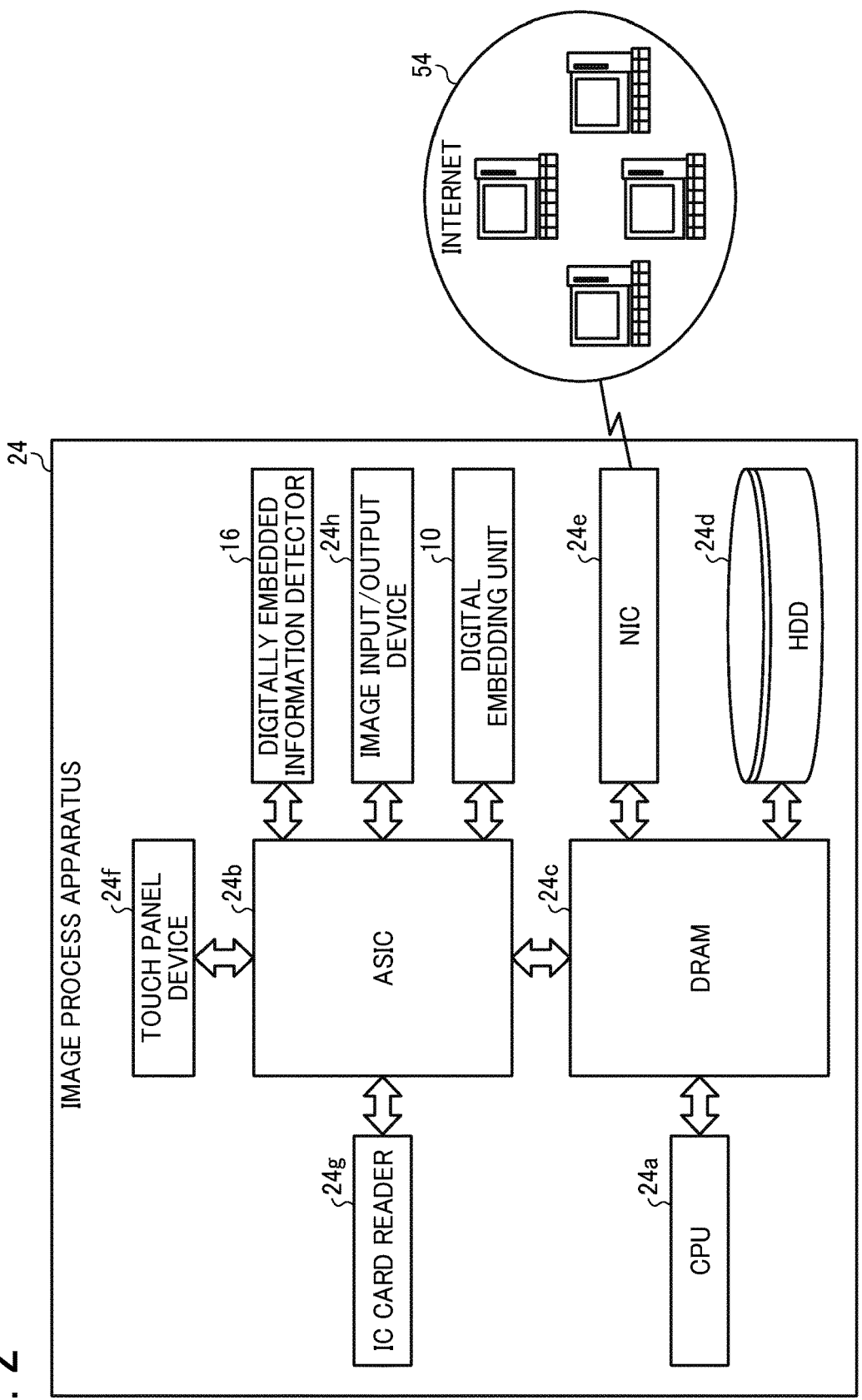
FIG. 2 is a block diagram illustrating a hardware configuration of an image processing apparatus according to an embodiment of the present disclosure.

FIG. 2 is a block diagram illustrating a hardware configuration of the image processing apparatus 24. As illustrated in FIG. 2, the image processing apparatus 24 includes a central processing unit (CPU) 24a, an application specific integrated circuit (ASIC) 24b, a dynamic random access memory (DRAM) 24c, a hard disc drive (HDD) 24d, a network interface card (MC) 24e, the digital embedding unit 10, the digitally embedded information detector 16, a touch panel device 24f, an IC card reader 24g, and an image input/output device 24h. The CPU 24a controls the entire operation of the image processing apparatus 24. The ASIC 24b is an integrated circuit (IC) adapted for image processing that includes hardware elements for image processing. The image input/output device 24h is an automatic document feeder (ADF) or a plotter.

The CPU 24a is connected to the ASIC 24b, the HDD 24d and NIC 24e via the DRAM 24c.

The ASIC 24b is connected to the digital embedding unit 10, the digitally embedded information detector 16, the touch panel device 24f, the IC card reader 24g, and the image input/output device 24h.

The operation display unit 2 is implemented by the touch panel device 24f including, for example, a liquid crystal display that displays information and operating switches that accept an input of information, such as a keyboard, a mouse, and a touch panel. The operation display unit 2 reads information constituted as image data or document data into the image processing apparatus 24 to accept user input of information to be registered. The information to be registered may be referred to as "registration information" hereinafter. Further, the operation display unit 2 displays an access log to the registration information. The access log is acquired by the tracing unit 20 described later of the image processing apparatus 24. Alternatively, the access log is acquired by a tracing unit 48 of the tracing apparatus 52 and transferred from the tracing apparatus 52 to the image processing apparatus 24. The access log to the registration information may be referred to as a "trace result" hereinafter.

The controller 4 is implemented by the CPU 24a. The primary storage unit 12 is implemented by a memory such as the DRAM 24c. The secondary storage unit 14 is implemented by the HDD 24d. Alternatively, the secondary storage unit 14 may be implemented by a storage unit such as a memory card. The secondary storage unit 14 stores a program P1. The controller 4 executes the program P1 loaded from the secondary storage unit 14 to the primary storage unit 12 using the primary storage unit 12 as a work area.

The controller 4 executes the program P1 to control various operations of the image processing apparatus 24. The program P1 activates software belonging to a service layer and a handler layer in a software group described later to run on an operating system (OS). Further, the program P1 activates software belonging to an application layer in the software group to run, and thereby controls operations of the image processing apparatus 24. Furthermore, when storing the registration information in the image processing apparatus 24, the controller 4 associates access authorization to an access log to the registration information with the tracing data. The controller 4 further acquires the trace result, stores the trace result, and generates the tracing data.

Still further, the controller 4 stores data for activating the program P1 together with the registration information. Examples of the data for activating the program P1 include a shortcut of an execution file. The program P1 executed by the controller 4 may be stored in a file of an installable or executable format on any suitable computer-readable storage medium such as a CD-ROM, a memory card, a compact disc-recordable (CD-R), or a digital versatile disc (DVD) as well as stored in advance in the secondary storage unit 14 as described above.

Further, the program P1 may be stored on another computer connected to the communication unit 22 described later and downloaded via the communication unit 22. Furthermore, the program P1 may be distributed via the Internet 54.

The image input unit 6 is implemented by the ADF as the image input/output device 24h illustrated in FIG. 2. The image input unit 6 reads, into the image processing apparatus 24, the registration information that is input in a form of image data. Further, the image input unit 6 reads, into the image processing apparatus 24, information in which tracing data Tc (FIG. 11A) used for tracing the registration information, an access destination in which the registration information is stored, or a program, is embedded. A detailed description is given later of the tracing data Tc. The information in which the tracing data Tc is embedded may be referred to as "trace information" hereinafter.

The image output unit 8 is implemented by a plotter as the image input/output device 24h illustrated in FIG. 2, or the ASIC 24b that performs image processing. The image output unit 8 outputs the tracing data Tc or the trace information as image data or document data by image processing or image output.

The digital embedding unit 10 embeds, in the registration information that is read in from the operation display unit 2, the tracing data Tc as a digital watermark.

The primary storage unit 12 reads out the program P1 from the secondary storage unit 14 as described above. Further, the primary storage unit 12 temporarily stores the registration information and image data containing and a digital watermark embedded therein, each being read by the image input unit 6, the registration information read by the operation display unit 2, and the trace information Tc when the trace information Tc is generated, and functions as a work area when the digital embedding unit 10 embeds a digital watermark and the digitally embedded information detector 16 perform processing of detecting digitally embedded information as described later.

The secondary storage unit 14 stores the program P1 executed by the controller 4, as described above. The secondary storage unit 14 further stores various data used by the image processing apparatus 24. Furthermore, the secondary storage unit 14 accumulates and stores the registration information as needed.

When the digitally embedded trace information is read by the image input unit 6, the digitally embedded information detector 16 detects the digitally embedded trace information.

The authentication unit 18 is implemented by the IC card reader 24g illustrated in FIG. 2, The authentication unit 18 authenticates a user based on personal information read out from the IC card or biometric data such as a fingerprint of the user. Examples of the personal information read out from the IC card include ID information such as a passcode.

The tracing unit 20 transmits the tracing data Tc (FIG. 11A) to the database 40 as an access destination or the tracing apparatus 52 via the communication unit 22 to acquire, from the database 40 as the access destination or the tracing apparatus 52, the trace result of the registration information associated with the tracing data Tc. Further, the tracing unit 20 checks whether the tracing data Tc (FIG. 11A) to be associated with the registration information is not the same as any other tracing data Tc.

The communication unit 22 is implemented by the NIC 24e illustrated in FIG. 2, and achieves external communications. The communication unit 22 enables the image processing apparatus 24 to communicate with the database 40 and the tracing apparatus 52 via the Internet 54 as needed. This communication enables the image processing apparatus 24 to generate the tracing data Tc, which is unique data. Further, the communication unit 22 transmits the read registration information and the tracing data Tc to the database 40. Alternatively, the communication unit 22 transmits, to the database 40, the registration information in which the trace information including the tracing data Tc is digitally embedded. The image processing apparatus 24 instructs the database 40 to trace the registration information. Further, the image processing apparatus 24 receives the trace result from the image processing apparatus 24, the tracing apparatus 52, and the database 40.

It should be noted that the image processing apparatus 24 is able to accumulate and store the registration information in the image processing apparatus 24 itself and instructs tracing of the registered information. Alternatively, the accumulation and storage of the registration information and the instruction of tracing of the registration information may be performed outside the image processing apparatus 24. Settings of a storage destination in which the registration information is to be registered and an instruction for tracing the registration information are configured according to a user instruction (initial setting process described later with reference to FIG. 15).

In the image processing apparatus 24 according to the present embodiment, the digital embedding unit 10, the digitally embedded information detector 16, the authentication unit 18, the tracing unit 20, etc., are implemented by, for example, but not limited to, hardware such as a dedicated ASIC. For example, the digital embedding unit 10, the digitally embedded information detector 16, the authentication unit 18, the tracing unit 20, etc. may be implemented by the controller 4, when executing according to the program P1.

Hereinafter, a description is given of the database 40.

The database 40 stores the registration information in a case in which the image processing apparatus 24 designates that the registration information is to be stored outside the image processing apparatus 24. As illustrated in FIG. 1, the database 40 includes a controller 26, a primary storage unit 28, a secondary storage unit 30, an authentication unit 32, an input/output unit 34, a tracing unit 36, a digitally embedded information detector 37, and a communication unit 38.

Figure 3:
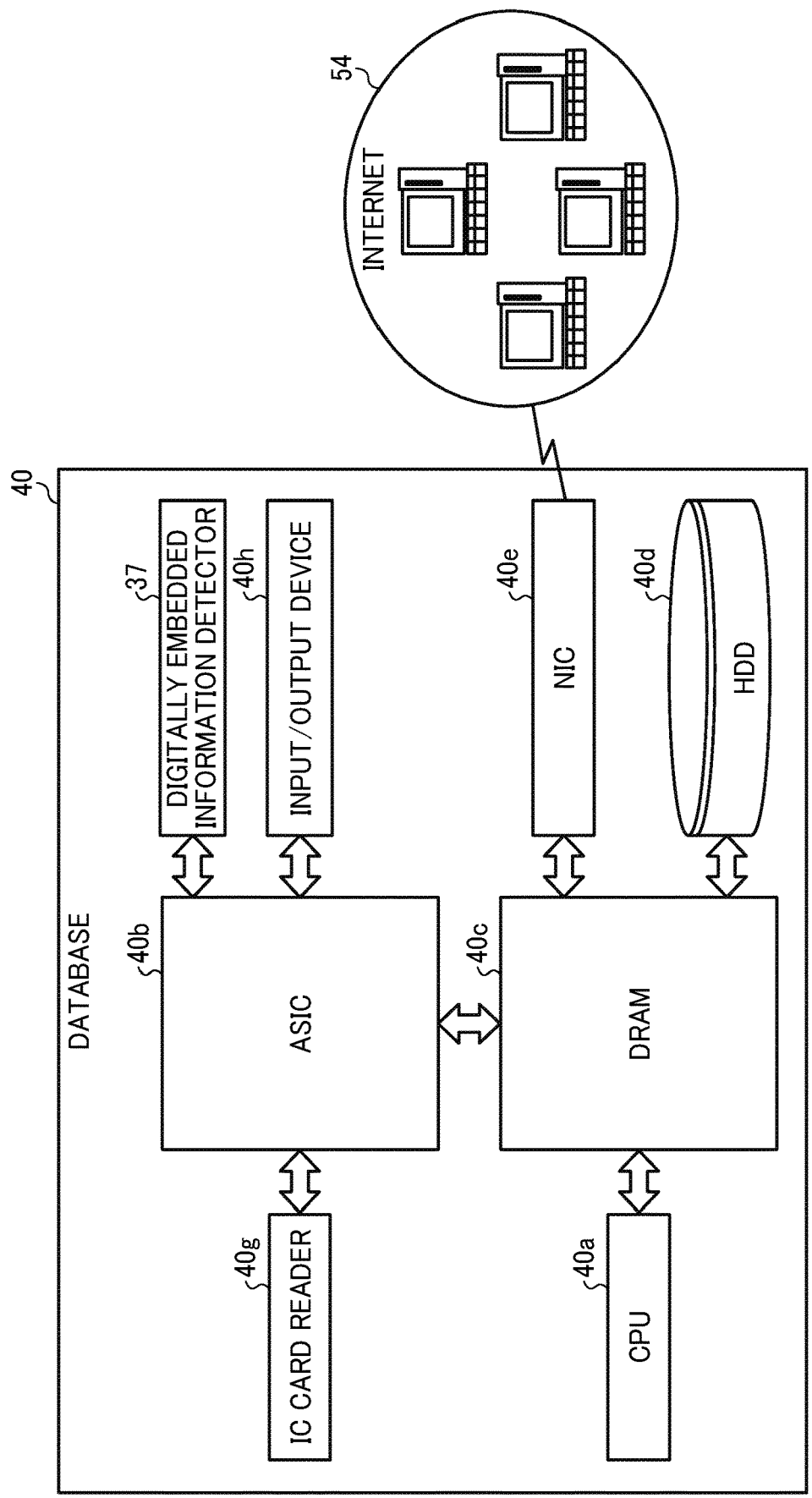
FIG. 3 is a block diagram illustrating a hardware configuration of a database according to an embodiment of the present disclosure.

FIG. 3 is a block diagram illustrating a hardware configuration of the database 40. As illustrated in FIG. 3, the database 40 includes a CPU 40a, an ASIC 40b, a DRAM 40c, an HDD 40d, an NIC 40e, the digitally embedded information detector 37, an IC card reader 40g, and an input/output device 40h. The CPU 40a controls the entire operation of the database 40. The ASIC 40b is an IC adapted for image processing that includes hardware elements for image processing.

The CPU 40a is connected to the ASIC 40b, the HDD 40d, and the NIC 40e via the DRAM 40c.

The ASIC 40b is connected to the digitally embedded information detector 37, the IC card reader 40g, and the input/output device 40h.

The controller 26 is implemented by the CPU 40a. The primary storage unit 28 is implemented by a memory such as the DRAM 40c. The secondary storage unit 30 is implemented by the HDD 40d. Alternatively, the secondary storage unit 30 may be implemented by a storage unit such as a memory card. The secondary storage unit 30 stores a program P2 and the registration information. The primary storage unit 28 reads out the program P2 from the secondary storage unit 30 and functions as a work area when the database 40 is accessed from the outside. Further, the primary storage unit 28 functions as a work area when the tracing unit 36 described later checks the uniqueness of the tracing data Tc.

The controller 26 executes the program P2 that is loaded from the secondary storage unit 30 to the primary storage unit 28. The controller 26 executes the program P2 to control various operations of the database 40. The program P2 activates software belonging to a service layer or a handler layer in a software group described later to run on an OS. Further, the program P2 activates software belonging to an application layer in the software group to run, and thereby controls operations of the database 40. Furthermore, when storing the registration information in the database 40, the controller 26 associates access authorization to an access log to the registration information with the tracing data Tc. The controller 26 further stores an access record to the registration information. Further, the controller 26 generates and manages the tracing data Tc as unique data that does not overlap with any other tracing data Tc.

The program P2 executed by the controller 26 may be stored in a file of an installable or executable format on any suitable computer-readable storage medium such as a CD-ROM, a memory card, a CD-R, or a DVD as well as stored in advance in the secondary storage unit 30 as described above.

Further, the program P2 may be stored on another computer connected to the communication unit 38 described later and downloaded via the communication unit 38. Furthermore, the program P2 may be distributed via the Internet 54.

The authentication unit 32 is implemented by the IC card reader 40g illustrated in FIG. 3, The authentication unit 32 checks access authorization to the registration information based on the personal information read out from the IC card, e.g., the ID information such as a passcode.

The input/output unit 34 is implemented by the input/output device 40h illustrated in FIG. 3. The input/output unit 34 manages an input/output operation performed on the registration information. Examples of the input/output operation performed on the registration information include editing, referring, printing, copying and downloading.

The digitally embedded information detector 37 detects a content of digital embed from the digitally embedded data that is input via the communication unit 38. When performing this detection, the digitally embedded information detector 37 is also able to extract the tracing data Tc (FIG. 11A) or the trace information.

Further, the tracing unit 36 checks whether the tracing data Tc (FIG. 11A) to be associated with the registration information is not the same as any other tracing data Tc.

The communication unit 38 is implemented by the NIC 40e illustrated in FIG. 3, and achieves external communications. The communication unit 38 communicates with the image processing apparatus 24 and the tracing apparatus 52 via the Internet 54. Through this communications, the database 40 receives, from the image processing apparatus 24, the registration information and the tracing data Tc, or the registration information in which the tracing data Tc is digitally embedded. Further, the database 40 receives an inquiry as whether the tracing data Tc is unique from the image processing apparatus 24, and sends a response to this inquiry. The database 40 receives an instruction for tracing the registration information from the image processing apparatus 24. Further, the database 40 transmits the trace result to the image processing apparatus 24 or the tracing apparatus 52.

In the database 40 according to the present embodiment, the authentication unit 32, the tracing unit 36, the digitally embedded information detector 37, etc., are implemented by, for example, but not limited to, hardware such as a dedicated ASIC. For example, the authentication unit 32, the tracing unit 36, the digitally embedded information detector 37 etc., may be implemented by the controller 26, when executing according to the program P2.

Hereinafter, a description is given of the tracing apparatus 52.

In a case in which the image processing apparatus 24 designates that the tracing of the registration information is to be performed outside of the image processing apparatus 24, the controller 42 (described later) of the tracing apparatus 52 generates unique tracing data Tc and transmits the generated tracing data Tc to the image processing apparatus 24. Further, the tracing apparatus 52 stores information indicating a storage destination in which the registration information is stored in association with the tracing data Tc. In response to receiving the tracing data Tc from the image processing apparatus 24, the tracing apparatus 52 transmits the tracing data Tc to the storage destination that is associated with the received tracing data Tc. Further, the tracing apparatus 52 transfers the trace result to the image processing apparatus 24. As illustrated in FIG. 1, the tracing apparatus 52 includes a controller 42, a primary storage unit 44, a secondary storage unit 46, a tracing unit 48, and a communication unit 50.

Figure 4:
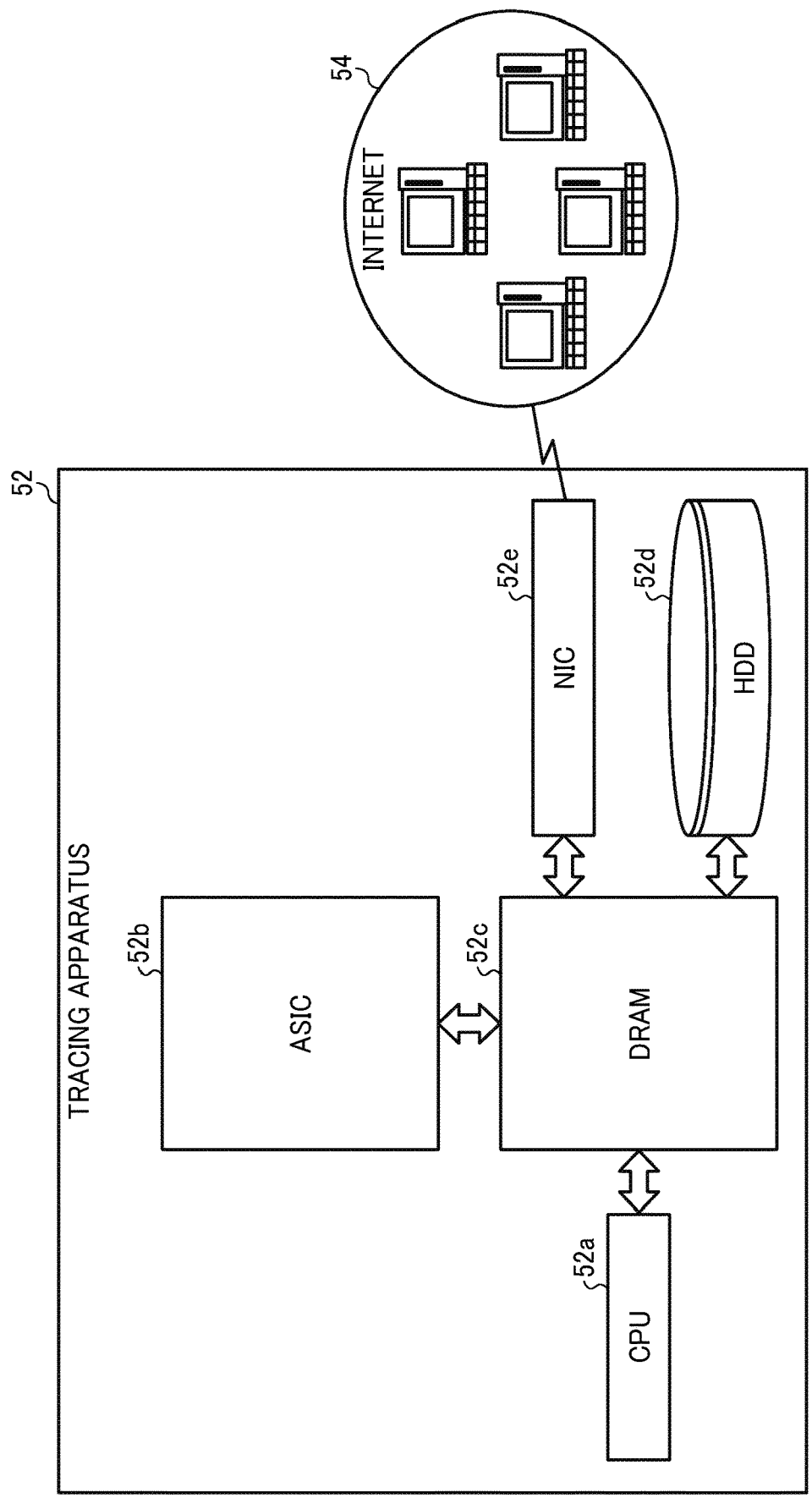
FIG. 4 is a block diagram illustrating a hardware configuration of a tracing apparatus according to an embodiment of the present disclosure.

FIG. 4 is a block diagram illustrating a hardware configuration of the tracing apparatus 52. As illustrated in FIG. 4, the tracing apparatus 52 includes a CPU 52a, an ASIC 52b, a DRAM 52c, an HDD 52d, and an NIC 52e. The CPU 52a controls the entire operation of the tracing apparatus 52. The ASIC 52b is an IC adapted for image processing that includes hardware elements for image processing.

The CPU 52a is connected to the ASIC 52b, the HDD 52d, and the NIC 52e via the DRAM 52c.

Figure 13B:
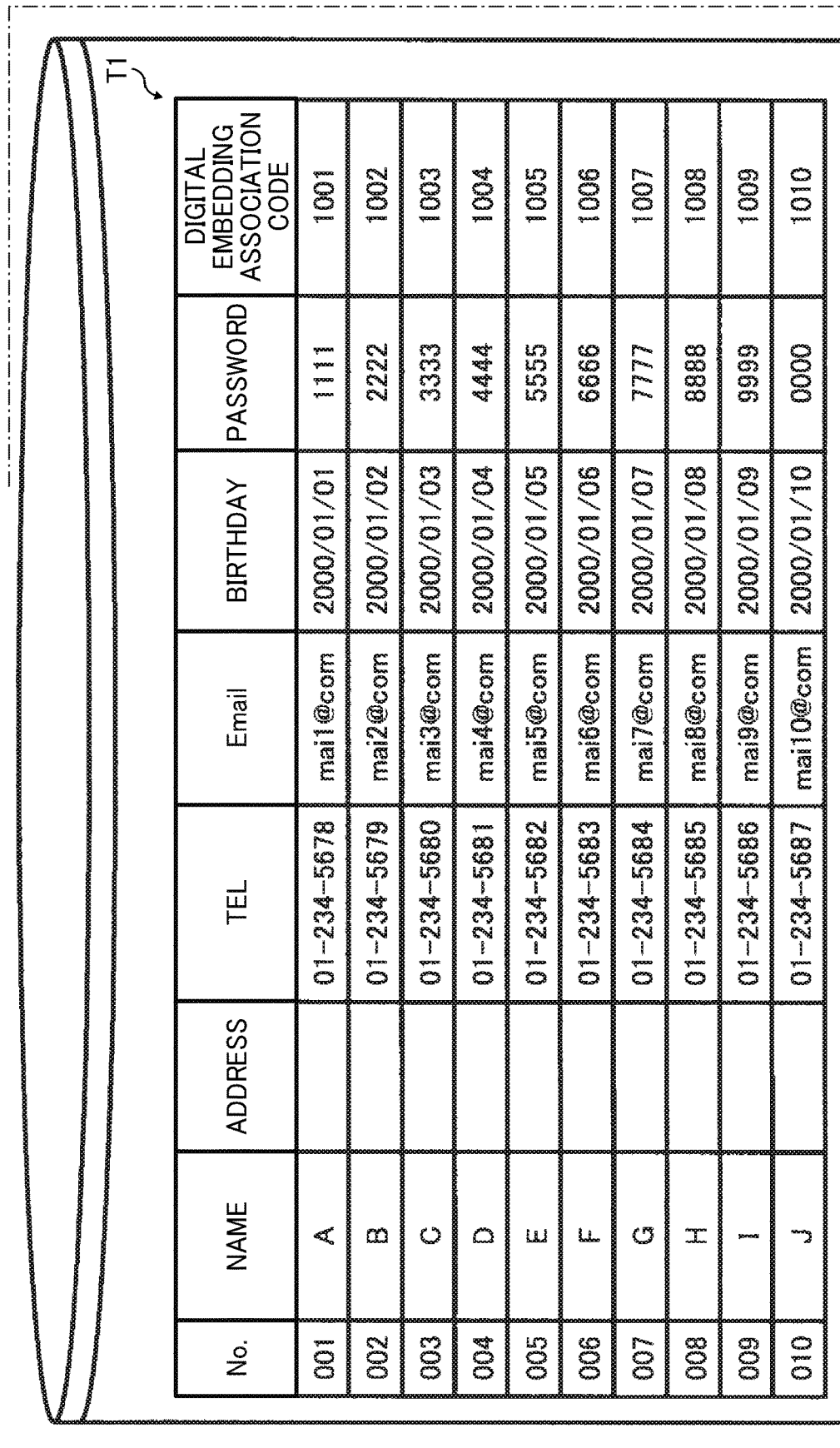
Figure 13C:
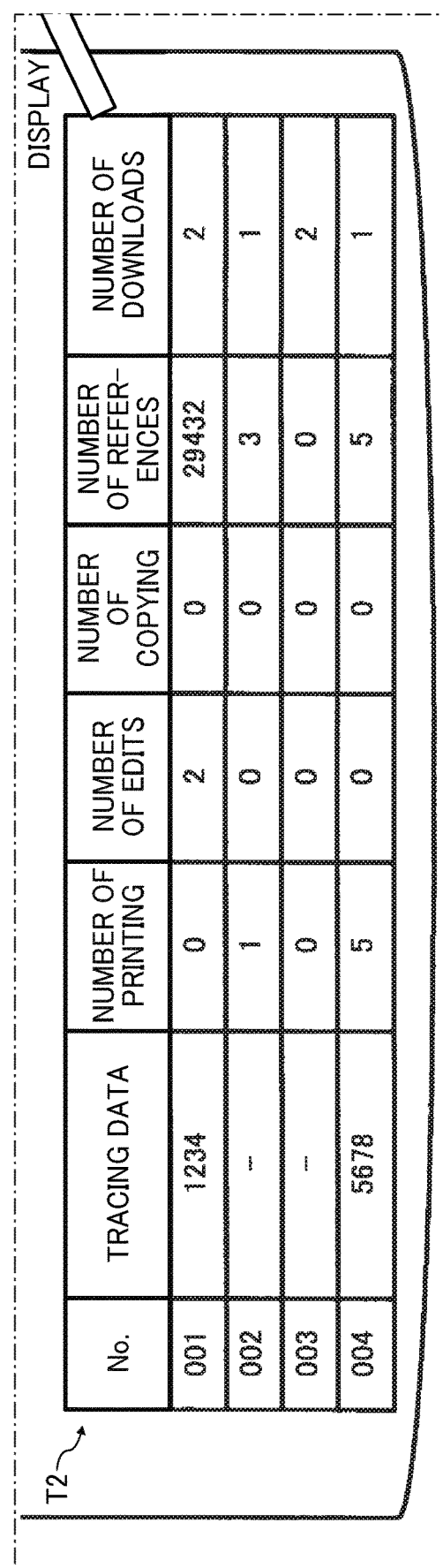

The controller 42 is implemented by the CPU 52a. The primary storage unit 44 is implemented by a memory such as the DRAM 52c. The secondary storage unit 46 is implemented by the HDD 52d. Alternatively, the secondary storage unit 46 may be implemented by a storage unit such as a memory card. The secondary storage unit 46 stores a program P3. Further, the secondary storage unit 46 stores, as information necessary for tracing the access log, the unique tracing data Tc and an access destination associated with the tracing data Tc. The primary storage unit 44 reads out, from the secondary storage unit 46, the program P3 and a trace table T5 (FIG. 13A) that stores the access destination associated with the unique tracing data Tc. A description is later of the trace table T5. Further, the primary storage unit 44 functions as a work area when the tracing apparatus 52 traces the access log.

The controller 42 executes the program P3 loaded from the secondary storage unit 46 to the primary storage unit 44. The controller 42 executes the program P3 to control various operations of the tracing apparatus 52. The program P3 activates software belonging to a service layer or a handler layer in a software group described later to run on an OS Further, the program P3 activates software belonging to an application layer in the software group to run, and thereby controls operations of the tracing apparatus 52.

The program P3 executed by the controller 42 may be stored in a file of an installable or executable format on any suitable computer-readable storage medium such as a CD-ROM, a memory card, a CD-R, or a DVD as well as stored in advance in the secondary storage unit 46 as described above.

Further, the program P3 may be stored on another computer connected to the communication unit 50 described later and downloaded via the communication unit 50. Furthermore, the program P3 may be distributed via the Internet 54.

The tracing unit 48 transmits the tracing data Tc (FIG. 11A) to the database 40 as an access destination or the image processing apparatus 24 via the communication unit 50 to acquire a trace result that the database 40 as the access destination or the image processing apparatus 24 manages in association with the tracing data Tc. Further, the tracing unit 48 checks whether the tracing data Tc (FIG. 11A) to be associated with the registration information is not the same as any other tracing data Tc.

The communication unit 50 is implemented by the MC 52e illustrated in FIG. 4, and achieves external communications. The communication unit 50 enables the tracing apparatus 52 to communicate with the database 40 and the image processing apparatus 24 via the Internet 54 as needed. Through this communication, the tracing apparatus 52 receives, from the image processing apparatus 24, information indicating the access destination and a request for transmitting the tracing data Tc, or receives the tracing data Tc. Further, the tracing apparatus 52 transmits the tracing data Tc to the image processing apparatus 24 or the database 40, and receives a trace result from the database 40 or the image processing apparatus 24. The tracing apparatus 52 transmits a target trace result to the image processing apparatus 24.

In the tracing apparatus 52 according to the present embodiment, the tracing unit 48 or the like are implemented by, for example, but not limited to, hardware such as a dedicated ASIC. For example, the tracing unit 48 or the like may be implemented by the controller 42, when executing according to the program P3.

The Internet 54 is a computer network connected to each of the image processing apparatus 24, the database 40, and the tracing apparatus 52. A user accesses the image processing apparatus 24, the database 40, and the tracing apparatus 52, each being connected to the Internet 54, to use the image processing system 100.

Figure 5:
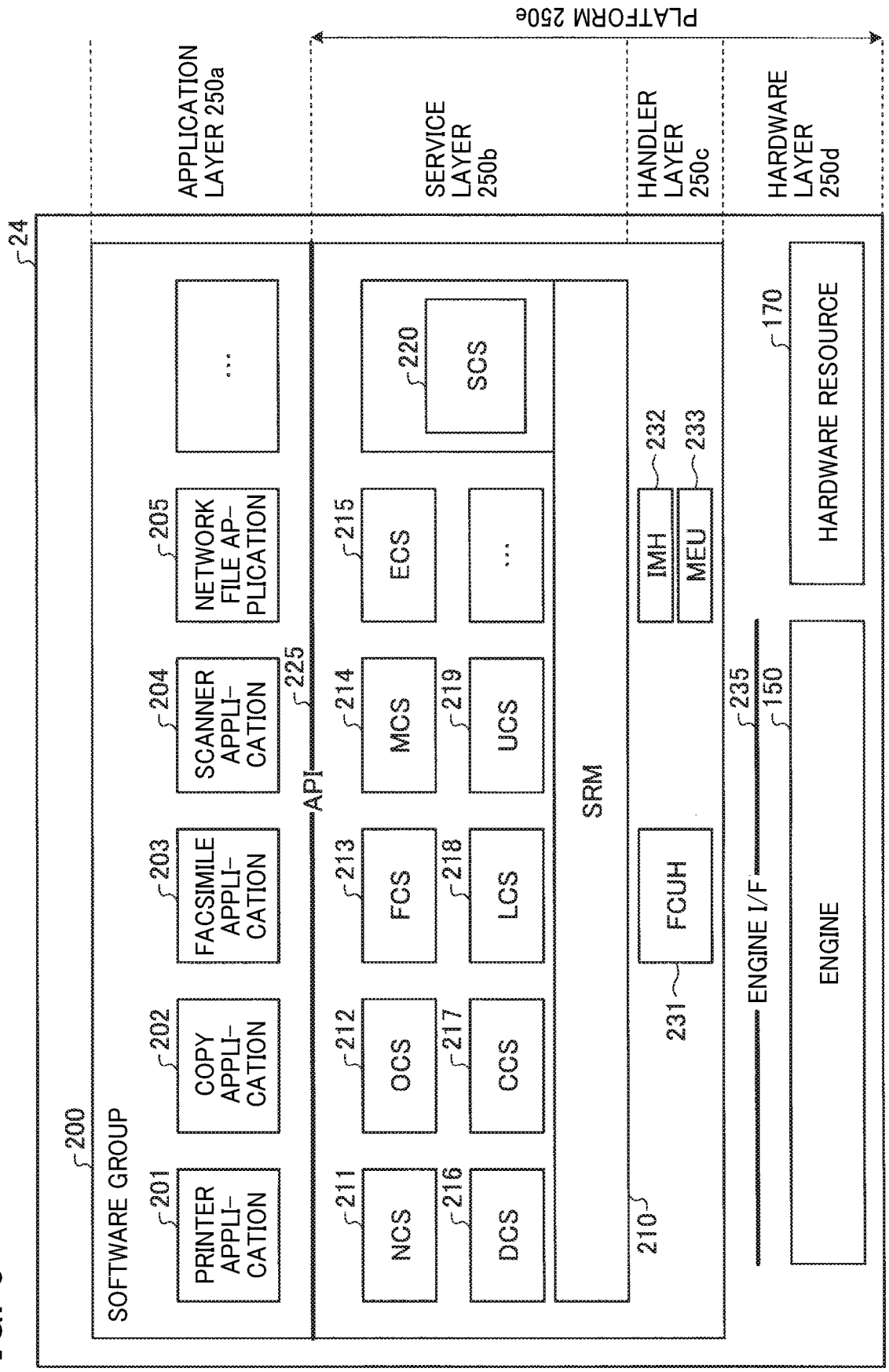
FIG. 5 is a block diagram illustrating a software configuration of the image processing apparatus according to an embodiment of the present disclosure.
Figure 6:
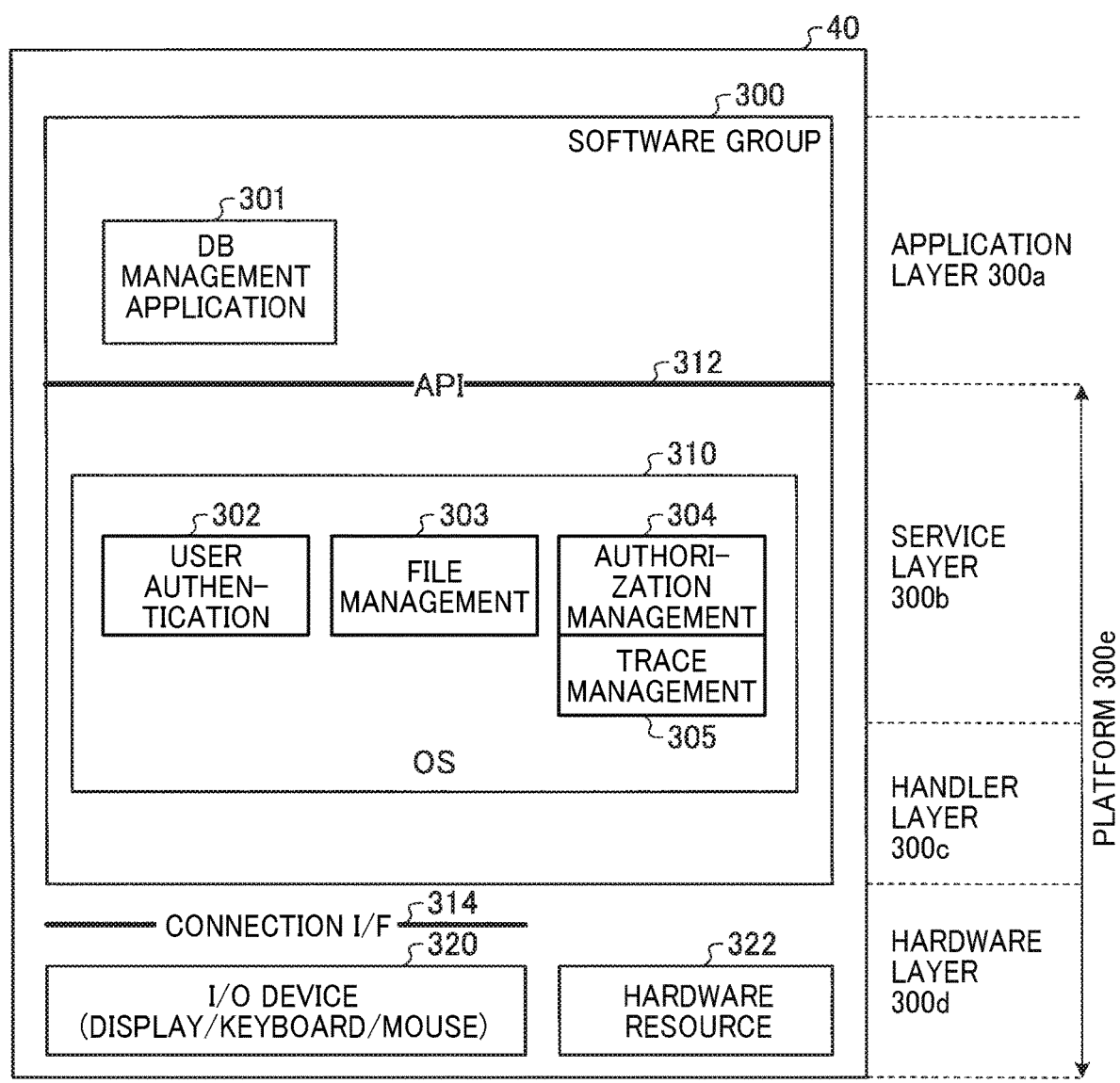
FIG. 6 is a block diagram illustrating a software configuration of the database according to an embodiment of the present disclosure.
Figure 7:
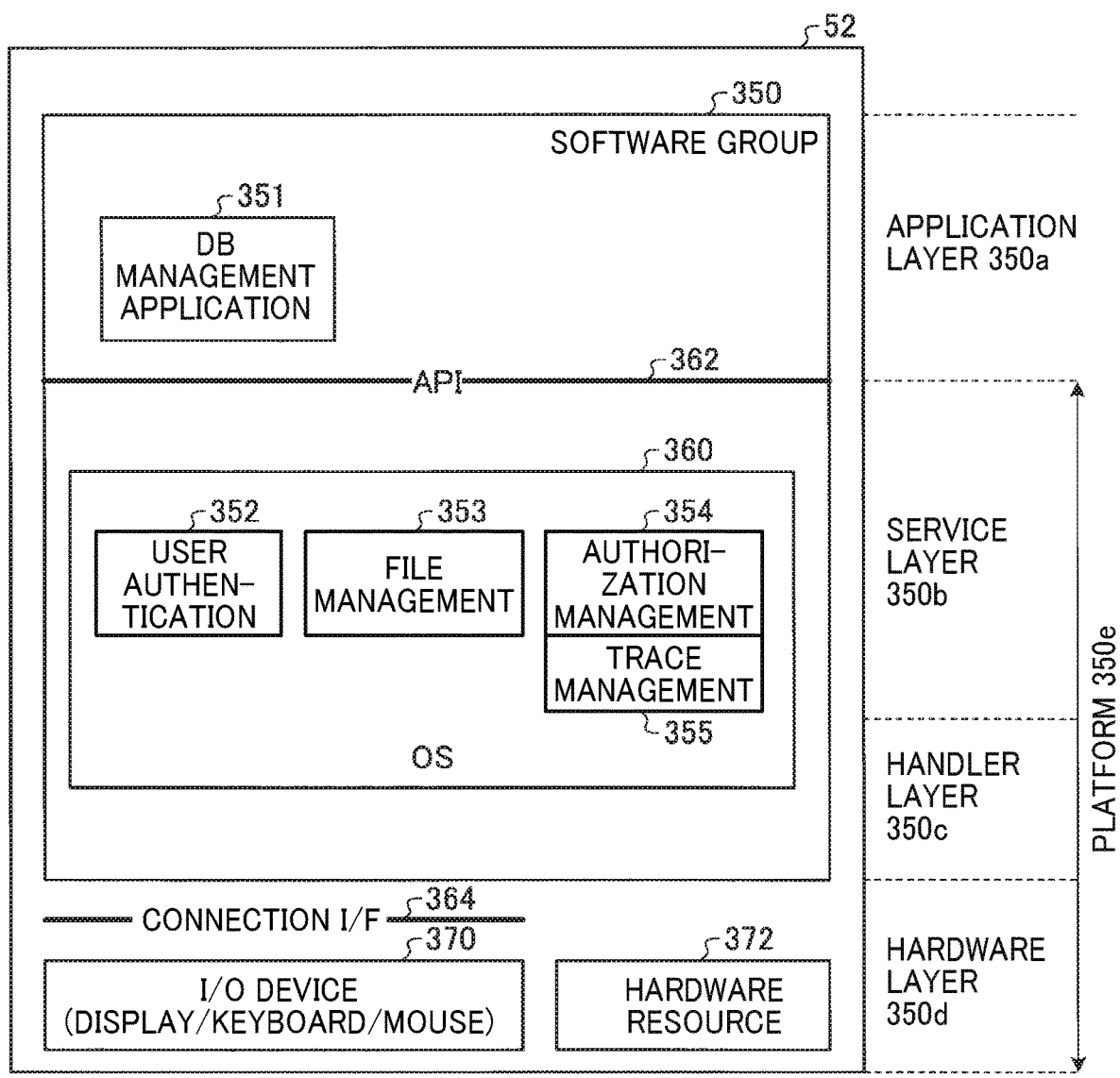
FIG. 7 is a block diagram illustrating a software configuration of the tracing apparatus according to an embodiment of the present disclosure.

Hereinafter, a description is given of a software configuration of the image processing system 100 with reference to FIGS. 5 to 7. FIG. 5 is a block diagram illustrating a software configuration of the image processing apparatus 24. FIG. 6 is a block diagram illustrating a software configuration of the database 40. FIG. 7 is a block diagram illustrating a software configuration of the tracing apparatus 52.

As illustrated in FIG. 5, the image processing apparatus 24 includes a software group 200 for implementing various operations in cooperation with an engine 150 and a hardware resource 170. The software group 200 includes an application layer 250a that runs on an OS such as UNIX (registered trademark) and a platform 250e.

As illustrated in FIG. 5, the platform 250e includes a service layer 250b, a handler layer 250c, and a hardware layer 250d. Further, the platform 250e includes an application program interface (API) 225 and an engine interface 235. The API 225 is a set of predefined functions that receives a processing request from the application layer 250a. The engine interface 235 is a set of predefined functions that sends a processing request to the hardware resource 170.

The application layer 250a includes software that controls the applications that the image processing apparatus 24 includes. In response to receiving an instruction or a setting request from an operation screen of the image processing apparatus 24, the software implemented on the application layer 250a sends a request to the platform 250e to execute a function of each application.

As illustrated in FIG. 5, the application layer 250a includes a printer application 201, a copy application 202, a facsimile application 203, a scanner application 204, and a network file application 205. The printer application 201 is an application for a printer. The copy application 202 is an application for a copier. The facsimile application 203 is an application for a facsimile. The scanner application 204 is an application for a scanner. The network file application 205 is an application for a network file The service layer 250b controls functions that the image processing apparatus 24 includes, such as an input function, an output function, a user authentication function, a digital embedding function, a digitally embedded information detection function, and a communication function.

As illustrated in FIG. 5, the service layer 250b includes one or more service modules (processes), such as a network control service (NCS) 211, an operation panel control service (OCS) 212, a facsimile control service (FCS) 213, a memory control service (MCS) 214, an engine control service (ECS) 215, a delivery control service (DCS) 216, a certification and charge control service (CCS) 217, a log control service (LCS) 218, a user information control service (UCS) 219, and a system control service (SCS) 220.

The NCS 211 provides a service shared and used among applications that involve a network input and output. The NCS 211 mediates communications between a network side and applications. Specifically, the NCS 211 receives data from the network side using protocols and allocates the received data to the corresponding application. Further, the NCS 211 receives data from the applications and transmits the received data to the network side. The OCS 212 controls the operation display unit 2 such as a touch panel that accepts an input of the registration information. The FCS 213 provides an API for performing, in response to a request from the application layer 250a, facsimile transmission and reception using public switched telephone networks (PSTN) or an integrated services digital network (ISDN), a process of storing facsimile data in a backup memory, a process of retrieving facsimile data from the backup memory, a process of reading facsimile, and a process of performing printing upon receiving a facsimile.

The MCS 214 performs memory control of the primary storage unit 12 and the secondary storage unit 14. The ECS 215 controls the hardware layer 250d, which is described later, including the engine 150 and the hardware resource 170. The DCS 216 controls, for example, delivery of stored documents. The CCS 217 performs control for authentication and charge. The LCS 218 manages and stores of log information. The UCS 219 manages user information. The SCS 220 performs processing such as application management, controlling an operation unit, displaying a system screen, hardware resource management, and controlling application's interruption.

The service layer 250b further includes a system resource manager (SRM) 210. The SRM 210 performs, together with the SCS 220, system control and management of the hardware resource 170. For example, the SRM 210 receives acquisition requests for using the engine 150 or the hardware resource 170 from an upper layer, and arbitrates the received acquisition requests to control execution. Specifically, the SRM 210 determines whether the hardware resource 170 for which the acquisition is requested is available. In a case in which the hardware resource 170 is available, the SRM 210 sends a notification indicating that the hardware resource 170 for which the acquisition is requested is available to the upper layer. Further, the SRM 210 performs scheduling of the acquisition requests received from the upper layer for enabling the usage of the hardware resource 170, and executes a request such as paper conveyance and image formation operation by a printer engine, memory allocation, and file generation.

The handler layer 250c controls writing and reading of data to and from the primary storage unit 12 and the secondary storage unit 14. Further, the handler layer 250c controls hardware belonging to the hardware layer 250d described later.

As illustrated in FIG. 5, the handler layer 250c includes a facsimile control unit handler (FCUH) 231, an image memory handler (IMH) 232, and a media edit utility (MEU) 233.

The FCUH 231 manages a control unit that is included in the hardware layer 250d and controls a facsimile function. The IMH 232 allocates memory to a process and manages the memory allocated to the process. The MEU 233 is connected to the hardware layer 250d and controls a media link board (MLB) included in the hardware resource 170.

As illustrated in FIG. 5, the hardware layer 250d includes the engine 150 and the hardware resource 170. The engine 150 is a hardware resource that controls a plotter or a scanner. The hardware resource 170 is a hardware resource(s) other than the engine 150, which exchanges data with engine 150.

Hereinafter, a description is given of a software configuration of the database 40 with reference to FIG. 6. As illustrated in FIG. 6, the database 40 includes a software group 300 for implementing various operations in cooperation with an input/output (I/O) device 320 and a hardware resource 322. The software group 300 includes an application layer 300a that runs on an OS such as UNIX® and a platform 300e.

The platform 300e includes a service layer 300b, a handler layer 300c, and a hardware layer 300d. Further, the platform 300e includes an API 312 and a connection interface 314. The API 312 is a set of predefined functions that receives a processing request from the application layer 300a. The connection interface 314 is a set of functions that sends a processing request to the I/O device 320.

The application layer 300a includes a database (DB) management application 301 that integrates controls for managing the database 40. In response to receiving a setting request, the DB management application 301 sends a request to the platform 300e to execute a function of an application.

The service layer 300b is contained in an OS 310. As illustrated in FIG. 6, the service layer 300b controls user authentication 302, file management 303, authorization management 304, and trace management 305 functions.

The handler layer 300c is also contained in the OS 310. The handler layer 300c controls writing and reading of data to and from the primary storage unit 28 and the secondary storage unit 30 illustrated in FIG. 1. Further, the handler layer 300c controls hardware belonging to the hardware layer 300d described later. For example, the handler layer 300c controls the I/O device 320 to accept an input or display an output result, etc.

As illustrated in FIG. 6, the hardware layer 300d includes the I/O device 320 and the hardware resource 322. The I/O device 320 is an input/output device such as a display, a keyboard and a mouse. The hardware resource 322 is a hardware resource(s) other than the I/O device 320, which exchanges data with the I/O device 320.

Hereinafter, a description is given of a software configuration of the tracing apparatus 52 with reference to FIG. 7. As illustrated in FIG. 7, the tracing apparatus 52 has substantially the same software configuration as that of the database 40 described above. The tracing apparatus 52 includes a software group 350 for implementing various operations in cooperation with an input/output (I/O) device 370 and a hardware resource 372. The software group 350 includes an application layer 350a that runs on an OS such as UNIX® and a platform 350e.

The platform 350e includes a service layer 350b, a handler layer 350c, and a hardware layer 350d. Further, the platform 350e includes an API 362 and a connection interface 364. The API 362 is a set of predefined functions that receives a processing request from the application layer 350a. The connection interface 364 is a set of functions that sends a processing request to the I/O device 370.

The application layer 350a includes a DB management application 351 that integrates controls for managing the trace result or the tracing data Tc, and the trace table T5 associating the tracing data Tc with the access destination, each being stored in the tracing apparatus 52. In response to receiving a setting request, the DB management application 351 sends a request to the platform 350e to execute a function of an application.

The service layer 350b is contained in an OS 360. As illustrated in FIG. 7, the service layer 350b controls each function of a user authentication 352, a file management 353, an authorization management 354, and a trace management 355.

The handler layer 350c is also contained in the OS 360. The handler layer 350c controls writing and reading of data to and from the primary storage unit 44 and the secondary storage unit 46 illustrated in FIG. 1. Further, the handler layer 350c controls hardware belonging to the hardware layer 350d described later. For example, the handler layer 350c controls the I/O device 370 to accept an input or display an output result, etc.

As illustrated in FIG. 7, the hardware layer 350d includes the I/O device 370 and the hardware resource 372. Examples of the I/O device 370 include a display, a keyboard, and a mouse. The hardware resource 372 is a hardware resource(s) other than the I/O device 370, which exchanges data with the I/O device 370.

Figure 8:
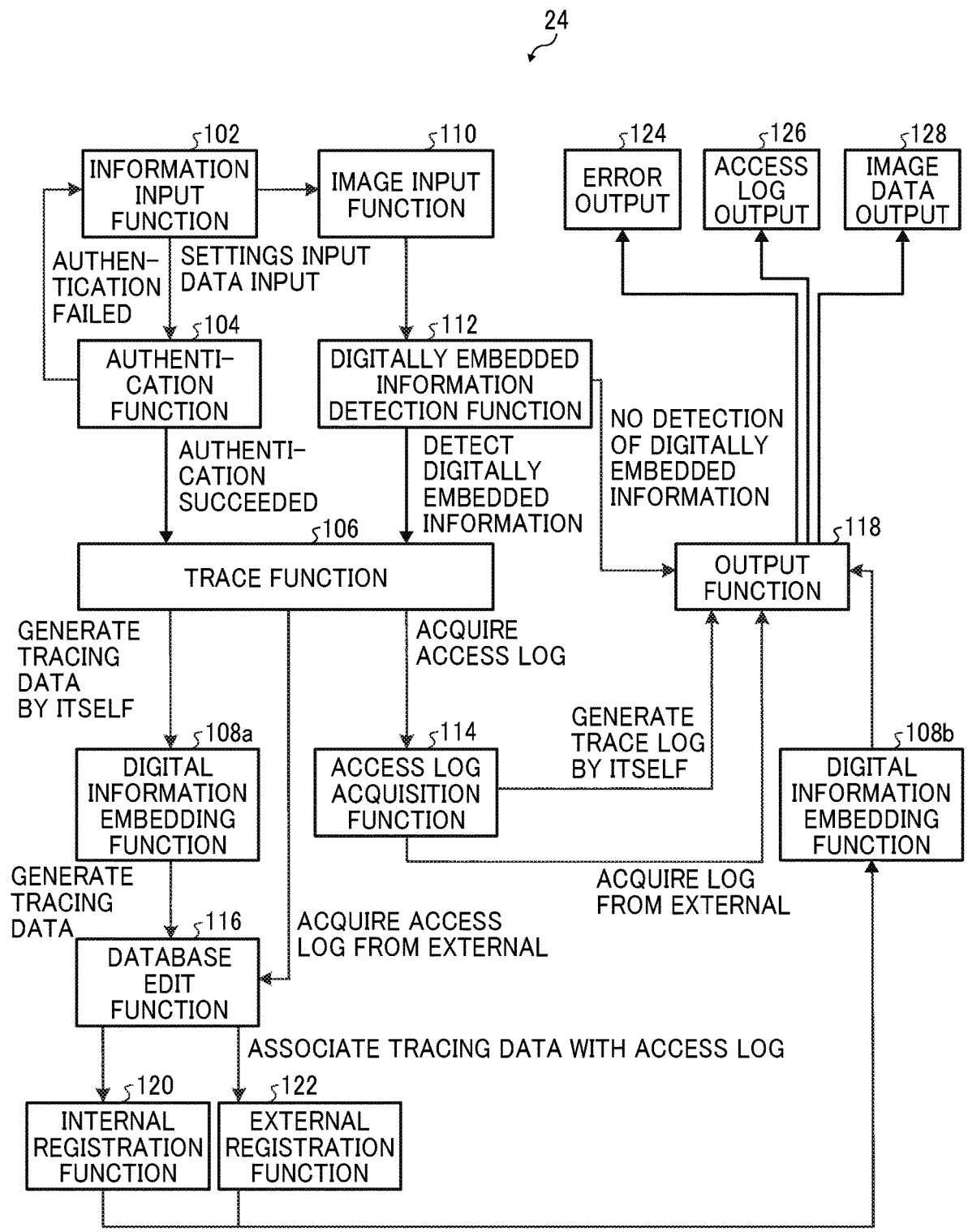
FIG. 8 is a block diagram illustrating a functional configuration of the image processing apparatus according to an embodiment of the present disclosure.
Figure 9:
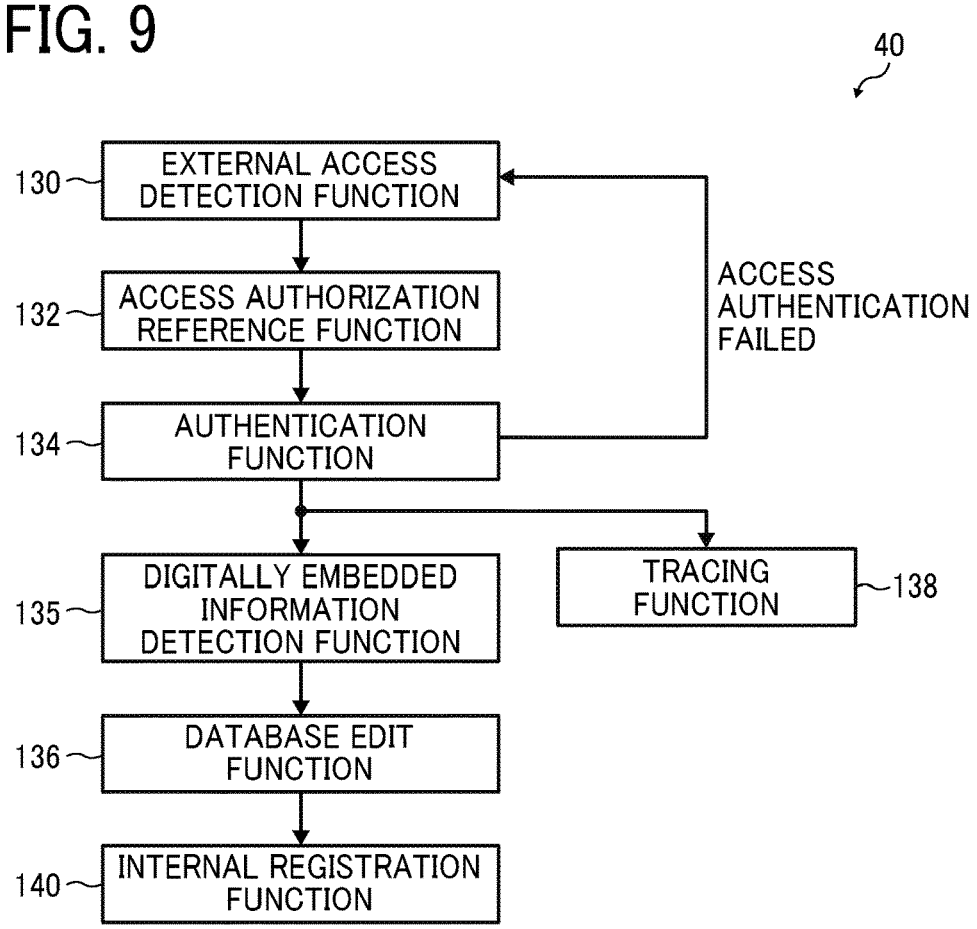
FIG. 9 is a block diagram illustrating a functional configuration of the database according to an embodiment of the present disclosure.
Figure 10:
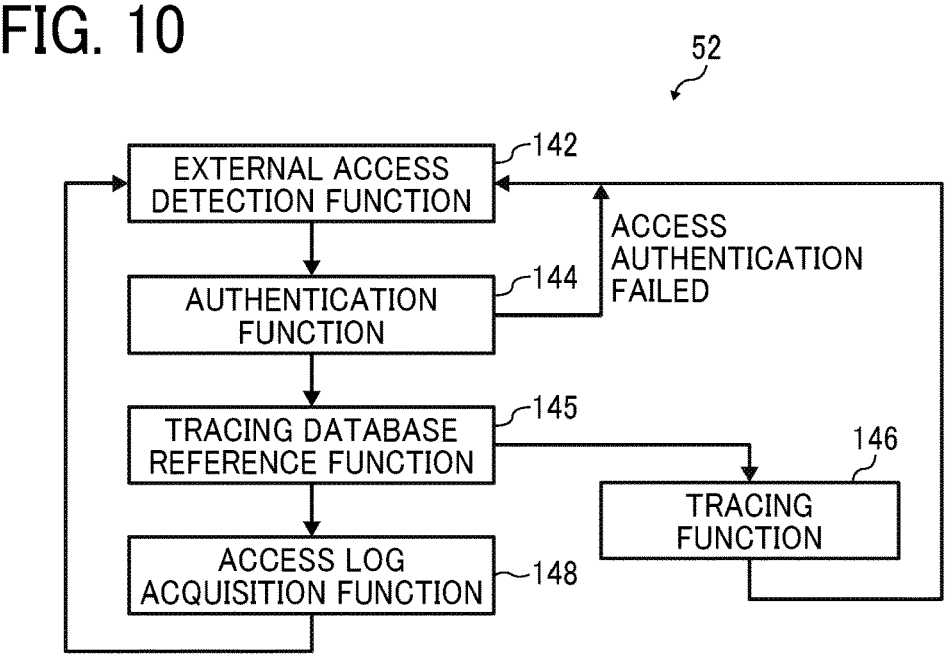
FIG. 10 is a block diagram illustrating a functional configuration of the tracing apparatus according to an embodiment of the present disclosure.

Hereinafter, a description is given of a functional configuration of the image processing system 100 with reference to FIGS. 8 to 10. FIG. 8 is a block diagram illustrating a functional configuration of the image processing apparatus 24. FIG. 9 is a block diagram illustrating a functional configuration of the database 40. FIG. 10 is a block diagram illustrating a functional configuration of the tracing apparatus 52.

First, a description is given of a functional configuration of the image processing apparatus 24 with reference to FIG. 8. As illustrated in FIG. 8, the image processing apparatus 24 includes an information input function 102, an authentication function 104, a trace function 106, digital embedding functions 108a and 108b, an image input function 110, a digitally embedded information detection function 112, an access log acquisition function 114, a database edit function 116, an output function 118, an internal registration function 120, and an external registration function 122.

The information input function 102 performs a process of configuring initial settings of the image processing system 100 (settings input) and a process of inputting the registration information (data input). A detailed description is given later of the process of configuring the initial settings. The operation display unit 2 illustrated in FIG. 1 implements the information input function 102.

The authentication function 104 authenticates a user of the image processing system 100. When the authentication is failed, the authentication function 104 causes the information input function 102 to request the user to input information again for the authentication. The authentication unit 18 illustrated in FIG. 1 implements the authentication function 104.

When the authentication of the user by the authentication function 104 is successful, the trace function 106 generates the tracing data Tc, which is unique data, in a case in which the tracing data Tc is to be generated by the image processing apparatus 24. Specifically, the trace function 106 checks whether there is no other tracing data Tc that overlaps with the tracing data Tc in a destination in which the registration information is to be registered in a case in which the tracing data Tc is to be acquired from the tracing apparatus 52, the trace function 106 communicates with the tracing apparatus 52 to acquire the tracing data Tc. Further, when the digitally embedded information detection function 112, which is described below, detects the tracing data Tc or when the tracing data Tc is input by the information input function 102, the trace function 106 requests the access log acquisition function 114 to communicate with a registration destination in which the registration information is stored to acquire a trace result. The tracing unit 20 illustrated in FIG. 1 implements the trace function 106.

The digital embedding function 108a embeds the tracing data Tc (FIG. 11A) described later in the registration information. The digital embedding function 108b embeds the tracing data Tc in an image, and outputs the image in which the tracing data Tc is embedded using the output function 118 described later. This enables a user who input the registration information to possess the image containing the tracing data Tc embedded therein. The digital embedding unit 10 illustrated in FIG. 1 implements the digital embedding function 108a and the digital embedding function 108b. It should be noted that a program that is executed when the image processing apparatus 24 detects the tracing data Tc or information indicating a registration destination in which the registration information is registered may be embedded in the registration information, in addition to the tracing data Tc.

The image input function 110 reads the image in which the trace information embedded or the registration information into the image processing apparatus 24. The image input unit 6 illustrated in FIG. 1 implements the image input function 110.

The digitally embedded information detection function 112 detects digitally embedded information from information inputted by the image input function 110. The digitally embedded information detection function 112 detects an access destination or an operation program as the trace information containing the tracing data Tc. The digitally embedded information detector 16 illustrated in FIG. 1 implements the digitally embedded information detection function 112.

The access log acquisition function 114 transmits the tracing data Tc to the access destination to acquire the trace result as the access log to the registration information. The tracing unit 20 illustrated in FIG. 1 implements the access log acquisition function 114.

The database edit function 116, in cooperation with the internal registration function 120 described later, manages the access log to the registration information and associates the access log with the tracing data Tc generated by the trace function 106 or the tracing data Tc acquired from outside. The controller 4 illustrated in FIG. 1 implements the database edit function 116.

The output function 118 performs an error output 124 in a case in which the digitally embedded information detection function 112 does not detect the digitally embedded information from image data input from the image input function 110. Further, the output function 118 outputs the trace result acquired by the access log acquisition function 114 (an access log output 126). Furthermore, the output function 118 performs an image data output 128. Specifically, the output function 118 outputs image data containing the trace information digitally embedded therein. The operation display unit 2 and the image output unit 8 illustrated in FIG. 1 implement the output function 118.

The internal registration function 120 accumulates and stores the registration information in the image processing apparatus 24, and gives an instruction for tracing. The secondary storage unit 14 illustrated in FIG. 1 implements the internal registration function 120.

The external registration function 122 transmits the registration information and the tracing data Tc to another image processing apparatus 24 or the database 40 as an outside resource of the image processing apparatus 24, and gives an instruction for tracing. The controller 4 illustrated in FIG. 1 implements the external registration function 122.

Hereinafter, a description is given of a functional configuration of the database 40 with reference to FIG. 9. As illustrated in FIG. 9, the database 40 includes an external access detection function 130, an access authorization reference function 132, an authentication function 134, a digitally embedded information detection function 135, a database edit function 136, a trace function 138, and an internal registration function 140.

The external access detection function 130 detects an access from the outside to the database 40. The controller 26 illustrated in FIG. 1 implements the external access detection function 130.

The access authorization reference function 132 refers to access authorization to the information registered in the database 40. The controller 26 illustrated in FIG. 1 implements the access authorization reference function 132.

The authentication function 134 authenticates a user who is accessing the database 40. When the access authentication has failed, the external access detection function 130 waits for a next access. The authentication unit 32 illustrated in FIG. 1 implements the authentication function 134.

The digitally embedded information detection function 135 detects digitally embedded information from the input information. Specifically, the digitally embedded information detection function 135 detects the tracing data Tc as embedded data. The digitally embedded information detector 37 illustrated in FIG. 1 implements the digitally embedded information detection function 135.

The database edit function 136 manages an access log to the registration information. Further, the database edit function 136 associates the tracing data Tc with the access log. The controller 26 illustrated in FIG. 1 implements the database edit function 136.

Further, the trace function 138 checks whether the tracing data Tc to be associated with an access log management authorization table T3 (described later) does not overlap with tracing data Tc generated so far. The tracing unit 36 illustrated in FIG. 1 implements the trace function 138.

The internal registration function 140 stores the registration information in the database 40, and gives an instruction for tracing. The secondary storage unit 30 illustrated in FIG. 1 implements the internal registration function 140.

Hereinafter, a description is given of a functional configuration of the tracing apparatus 52 with reference to FIG. 10. As illustrated in FIG. 10, the tracing apparatus 52 includes an external access detection function 142, an authentication function 144, a tracing database reference function 145, a tracing function 146, and an access log acquisition function 148.

The external access detection function 142 detects access to the tracing apparatus 52 from the outside. The controller 42 illustrated in FIG. 1 implements the external access detection function 142.

The authentication function 144 authenticates access authorization to the accessed data (access log) in tracing apparatus 52. When the authentication has failed, the external access detection function 142 waits for a next access. The controller 42 illustrated in FIG. 1 implements the authentication function 144.

The tracing database reference function 145 refers to the trace table T5 that is registered in the tracing apparatus 52 and associates the tracing data Tc with the access destination to set the access destination based on the received tracing data Tc. The tracing unit 48 illustrated in FIG. 1 implements the tracing database reference function 145.

The tracing function 146 transmits, to the image processing apparatus 24 from which a request is received, unique tracing data Tc from the trace table T5. The tracing unit 48 illustrated in FIG. 1 implements the tracing function 146.

The access log acquisition function 148 transmits the tracing data Tc to the access destination acquired by the tracing database reference function 145 to acquire the trace result. The access log acquisition function 148 transmits the acquired trace result to the image processing apparatus 24 from which a request is received. The tracing unit 48 illustrated in FIG. 1 implements the access log acquisition function 148.

As described above with reference to FIGS. 8 to 10, in the image processing system 100, the image processing apparatus 24 is able to store the registered information in the image processing apparatus 24 and acquire the trace result by itself. Alternatively, the registered information may be stored in the database 40 external to the image processing apparatus 24. In a case in which the registered information is stored in the database 40, the database 40 is able to acquire the trace result internally. Further, the acquisition of the trace result may be performed by the tracing apparatus 52.

In other words, the image processing system 100 can be constituted by only the image processing apparatus 24. Alternatively, the image processing system 100 may include the database 40 and the tracing apparatus 52 in addition to the image processing apparatus 24. The configuration of the image processing system 100 may be determined by considerations of scale, application or the like of the system.

Hereinafter, an overview is given of an operation performed by the image processing system 100. The following description is given of an example operation in which information that is input to the image processing apparatus 24 is stored in the database 40, and the tracing apparatus 52 acquires the trace result.

Figure 11B:
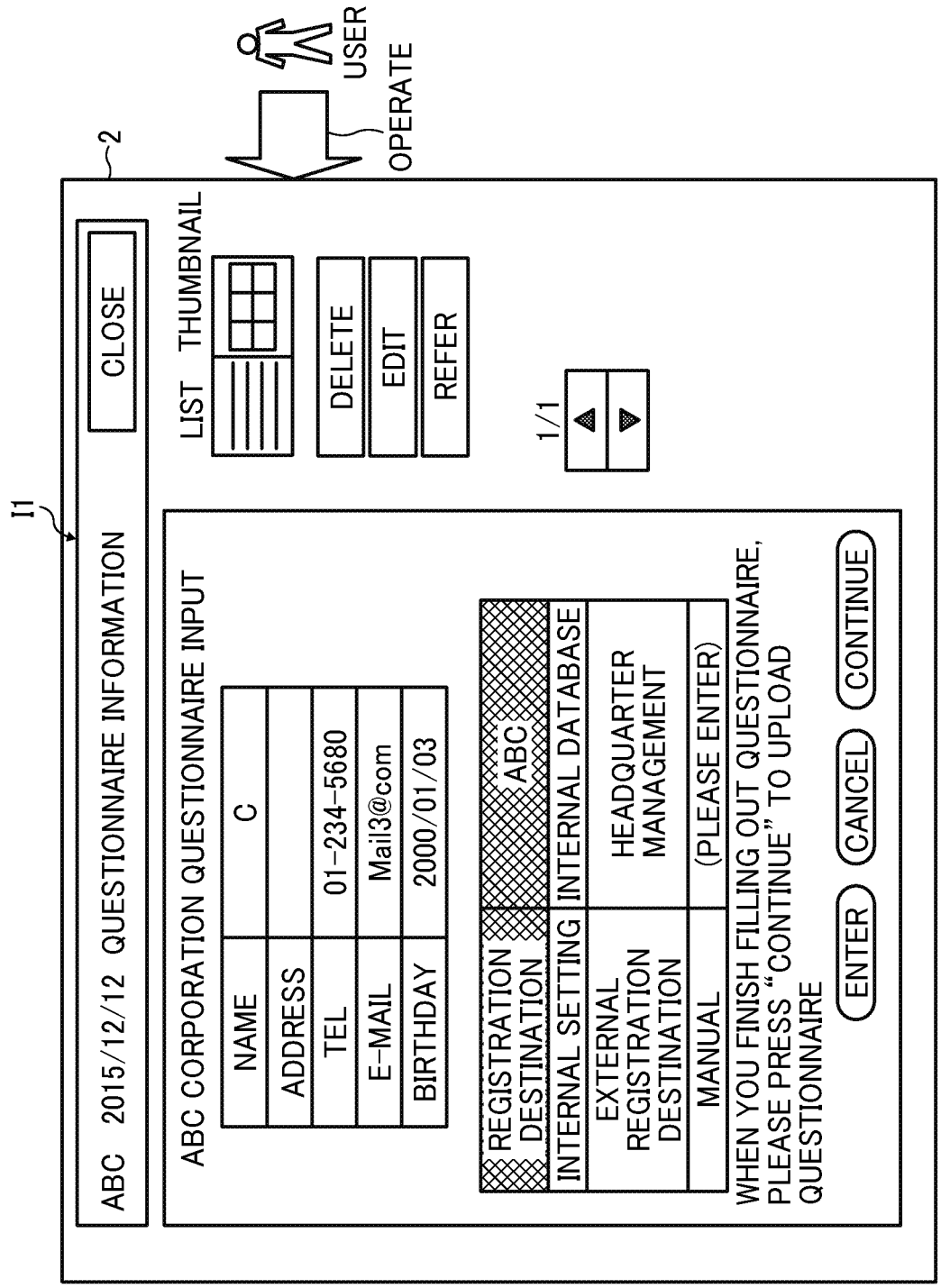

A description is given of the overview of a data registration process performed image processing system 100 with reference to FIGS. 11A-11B, and 12A-12C. FIGS. 11A and 11B illustrate the data registration process performed by the image processing system 100. FIGS. 12A to 12C illustrate an example of a data configuration.

As illustrated in FIGS. 11A and 11B, when a user enters information I1, such as a response to a questionnaire, on the operation display unit 2 of the image processing apparatus 24, the image processing apparatus 24 reads the entered information I1 as information I2 that can be registered. Further to generate the tracing data Tc as unique data, the image processing apparatus 24 communicates with the tracing apparatus 52.

The image processing apparatus 24 uploads the read information I2 and the tracing data Tc to the database 40. The database 40 writes the uploaded information I2 into a vacant area in a data table T1 that is stored in the database 40. In an example illustrated in FIG. 12A, the information I2 is written into a "003" field as the vacant area in the data table T1.

Further, the information I2 written into the database 40 is associated with an access log table T2 by the tracing data Tc. The access log table T2 accumulates an access history to each piece of the information I2. The access log table T2 is further associated with an access log management authorization table T3 that stores management authorization for the access log table T2. Furthermore, the access log management authorization table T3 is associated with a download management table T4.

The access log table T2 stores the access history (access log) including a number of printings, a number of edits, a number of copying, a number of references, a number of downloads for the registered information in association with the tracing data Tc.

This enables the user to refer to the access log table T2 the information I2 written into the database 40 by using the tracing data Tc.

The access log management authorization table T3 stores access authorization to the access log table T2 in association with the tracing data Tc. According to an example of the access log table number "003" in FIG. 12B, authorization to access an access history (access log) to the uploaded information I2 is assigned, enabling reference to and downloading of the access history (access log).

The download management table T4 stores a record of downloads (download date) and who performed the download in association with the access log table number. It should be noted that no data is recorded in the download management table T4 in a case in which the download has not been performed.

Hereinafter, an overview is given of access log acquisition processing performed by the image processing system 100 with reference to FIGS. 13A to 13D. FIGS. 13A to 13D illustrate the overview of the access log acquisition processing performed by the image processing system 100.

As illustrated in FIG. 13A, in response to input of the information I1 (FIG. 11B) from the user, the image processing apparatus 24 outputs image data J1 in which the tracing data Tc is digitally embedded. The user receives and keeps the output image data J1. When the user wants to check an access history to the information I1, the user instructs the image processing apparatus 24 to read the image data J1.

When the image processing apparatus 24 reads the image data J1 and recognizes that the tracing data Tc is digitally embedded in the image data J1, the image processing apparatus 24 accesses the tracing apparatus 52. The tracing apparatus 52 refers to the trace table T5 managed by the tracing apparatus 52 itself to determine an access destination based on the received tracing data Tc. Then, the tracing apparatus 52 sends the tracing data Tc to the database 40 determined as the access destination. The database 40 refers to the access log table T2 that is associated with the registered data table T1 by the tracing data Tc. The database 40 transmits, to the tracing apparatus 52, a corresponding trace result (access log) in the access log table T2. The tracing apparatus 52 transfers the trace result to the image processing apparatus 24.

The database 40 or the tracing apparatus 52 refers to a field of the tracing data Tc in the access log table T2 to extract an access log L1 to the information corresponding to the tracing data Tc. Further, the database 40 or the tracing apparatus 52 transmits the extracted access log L1 to the image processing apparatus 24. The image processing apparatus 24 receives the transmitted access log L1 and displays the received access log L1 on the operation display unit 2 of the image processing apparatus 24, as illustrated in FIGS. 13A to 13D.

As illustrated in FIGS. 13A to 13D, the access log L1 displayed on the operation display unit 2 of the image processing apparatus 24 includes the number of printings, the number of edits, the number of copying, the number of references, and the number of downloads. The number of printing indicates how many times the registered information is printed. The number of edits indicates how many times the registration information is edited. The number of copying indicates how many times the registered information is copied. The number of references indicates how many times the registered information is referred to. The number of downloads indicates how many times the registered information is downloaded. In addition, in a case in which the download of the registered information has been performed, the access log L1 includes either or both of the download date and the person who downloaded the information.

The user views a content of the access log L1 displayed on the operation display unit 2 of the image processing apparatus 24 to check whether the information has been leaked. In an example of FIGS. 13A to 13D, the user viewing the access log L1 can tell that the number of references to the registered information is extremely large. Accordingly, it is presumed that the registered information has been accessed from outside.

Figure 14:
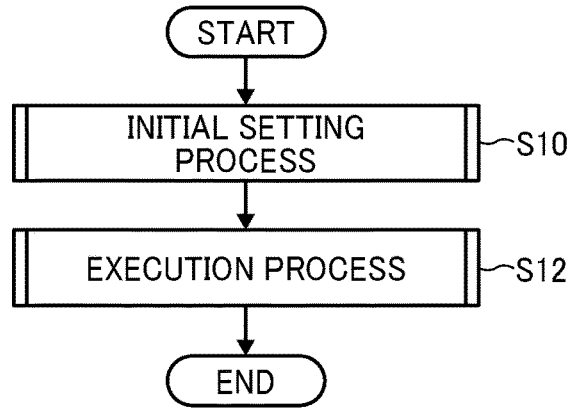
FIG. 14 is a flowchart illustrating overall processing performed by the image processing system according to an embodiment of the present disclosure.

Hereinafter, a description is given of an operation performed by the image processing system 100 with reference to drawings. FIG. 14 is a flowchart illustrating overall processing performed by the image processing system 100.

First, the image processing apparatus 24 performs an initial setting process (S10). The initial setting process includes configuring settings of a registration destination in which information read by the image processing apparatus 24 is to be registered. Further, the initial setting process also includes configuring settings of an acquisition destination by which acquisition of an access log is performed. Furthermore, the initial setting process includes configuring settings of an apparatus or a database by which the tracing data Tc is to be generated. Finally, the initial setting process includes configuring settings specifying whether a detection of digitally embedded information is to be performed. A description is given later of the initial setting process with reference to FIG. 15.

Next, the image processing apparatus 24 performs execution process (S12). The execution process includes a process of acquiring a trace result to information read by the image processing apparatus 24 based on the information and a process of displaying the acquired trace result. A description is given later of the execution process with reference to FIG. 18.

Figure 15:
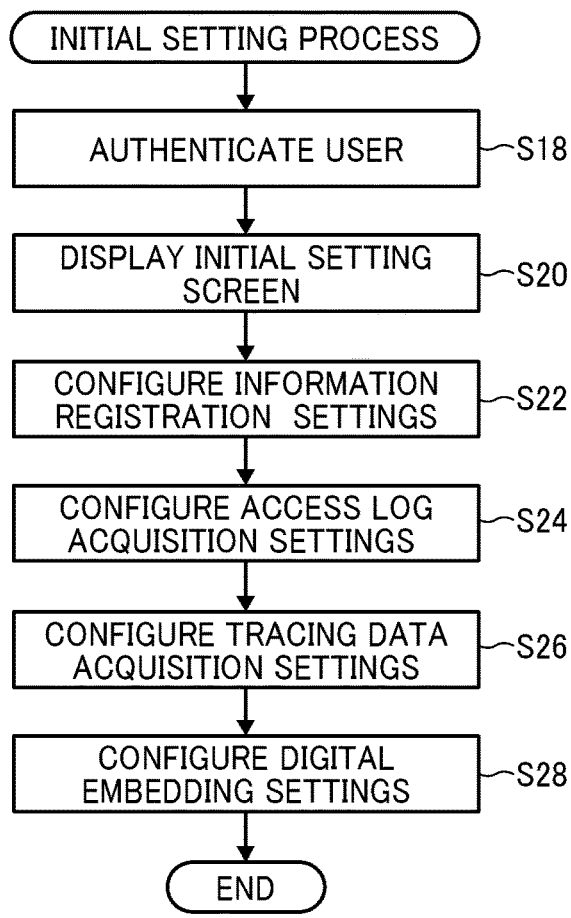
FIG. 15 is a flowchart illustrating steps in an initial setting process according to an embodiment of the present disclosure.
Figure 16:
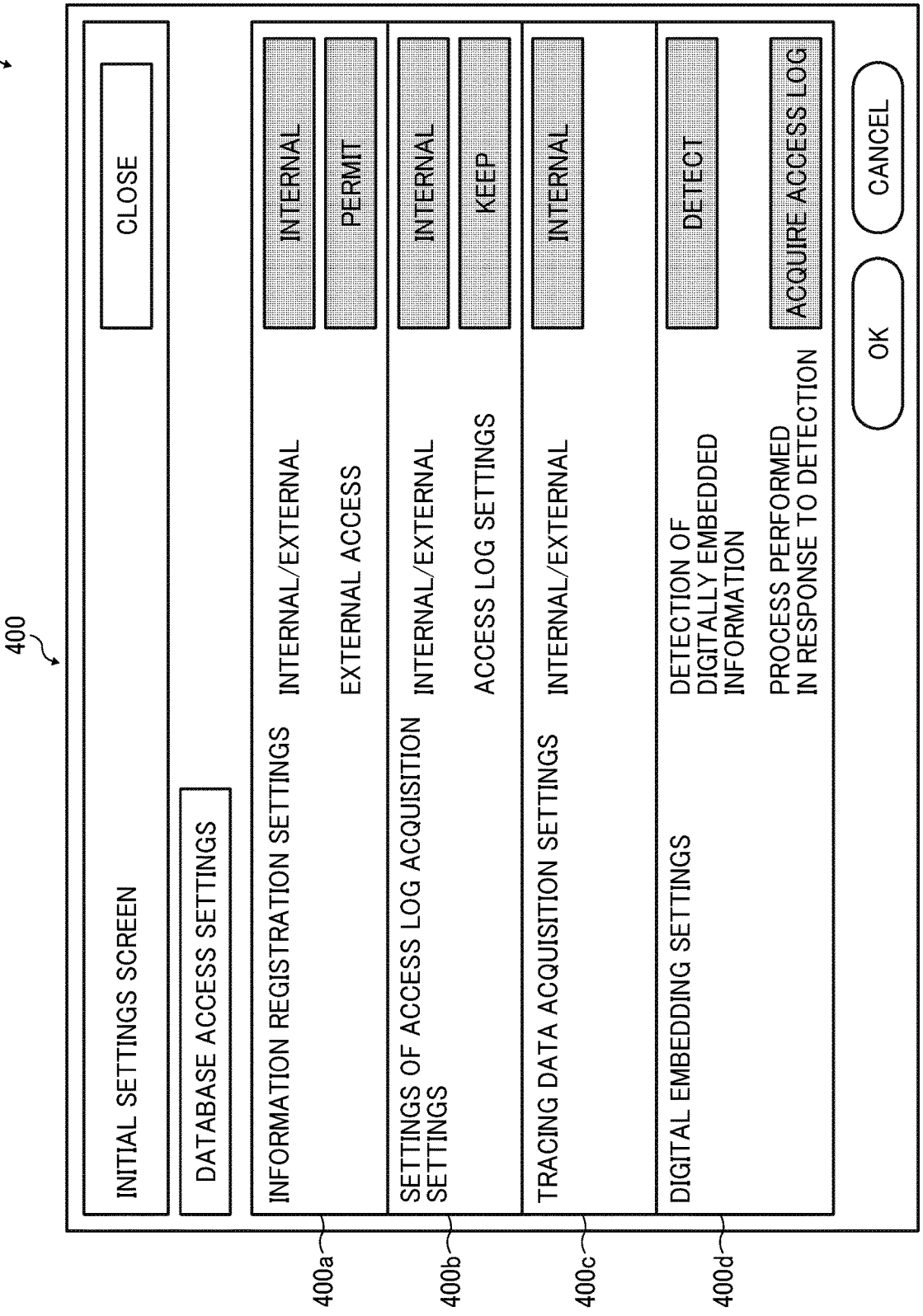
FIG. 16 is a view illustrating an example of an initial setting screen according to an embodiment of the present disclosure.
Figure 17:
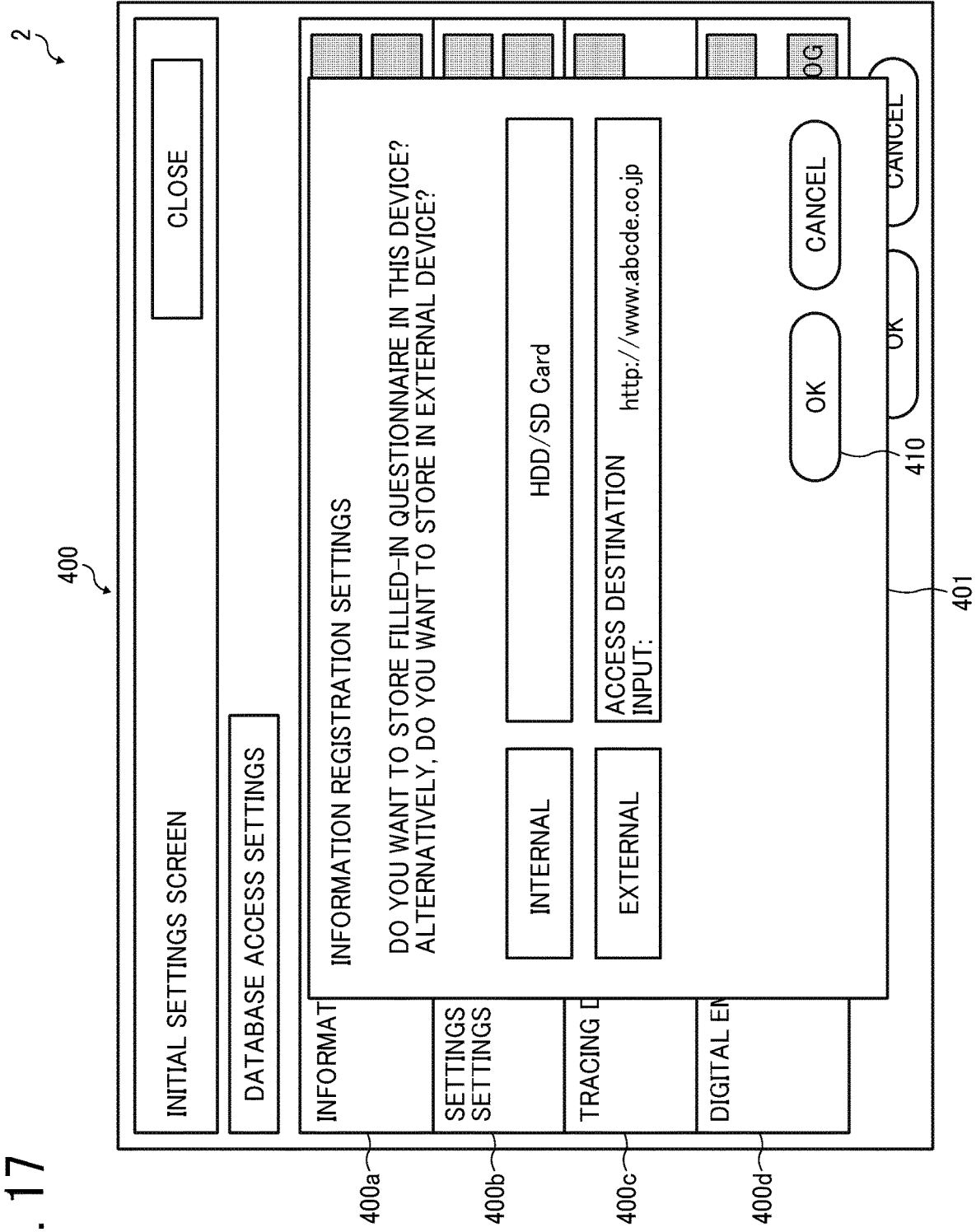
FIG. 17 is a view illustrating an example of a pop-up screen for configuring information registration settings according to an embodiment of the present disclosure.

FIG. 15 is a flowchart illustrating steps in the initial setting process of S10 in FIG. 14. Further, FIG. 16 is a view illustrating an example of an initial setting screen 400 displayed on a touch panel that constitutes the operation display unit 2 of the image processing apparatus 24. FIG. 17 is a view illustrating an example of a pop-up screen 401 for configuring information registration settings displayed on a touch panel that constitutes the operation display unit 2 of the image processing apparatus 24.

First, the image processing apparatus 24 authenticates a user (S18).

Next, the image processing apparatus 24 displays the initial setting screen 400 illustrated in FIG. 16 on the touch panel as an example of the operation display unit 2 (S20).

Subsequently, the image processing apparatus 24 configures information registration settings (S22). The information registration settings include a selection as to whether information is to be registered internally (in the image processing apparatus 24) or outside (in the database 40). Further, in a case in which the image processing apparatus 24 is selected as a destination in which the information is to be registered, the information registration settings include a selection as to whether external access is to be permitted or an access permission is to be set manually each time the information is input. Specifically, an information registration setting field 400a of the initial setting screen 400 illustrated in FIG. 16 accepts these selections.

For example, at S22, when the information registration setting field 400a is selected on the initial setting screen 400 is selected, the image processing apparatus 24 displays the pop-up screen 401 illustrated in FIG. 17. On the pop-up screen 401 illustrated in FIG. 17, a selection is made whether the information is to be registered internally (in the image processing apparatus 24) or externally (in the database 40). Further, the pop-up screen 401 accepts a designation of a storage destination in which the information is to be stored, in a case in which the information is to be registered in the image processing apparatus 24. Furthermore, the pop-up screen 401 accepts a designation of a storage destination in which the information is to be stored, in a case in which the information is to be registered outside of the image processing apparatus 24. The pop-up screen 401 illustrated in FIG. 17 is an example in which the image processing apparatus 24 is selected as the registration destination of the information while external access is also permitted. When the pop-up screen 401 illustrated in FIG. 17 accepts a selection of an OK key 410, the screen transitions to the initial setting screen 400 including the information registration setting field 400a as illustrated in FIG. 16.

Further, the image processing apparatus 24 configures access log acquisition settings (S24). The access log acquisition settings include a selection as to whether an access log of the registered information is to be acquired by the image processing apparatus 24 or from outside (by the database 40 or the tracing apparatus 52). Further, the access log acquisition settings include a selection as to whether the acquired access log is to be kept stored. Specifically, an access log acquisition setting field 400b of the initial setting screen 400 illustrated in FIG. 16 accepts these selections.

Furthermore, the image processing apparatus 24 configures tracing data acquisition settings (S26). The tracing data acquisition settings include a selection as to whether the tracing data Tc (FIG. 11A) is to be generated internally (by the image processing apparatus 24) or the tracing data Tc is to be generated externally (by the tracing apparatus 52) and acquired externally. Specifically, a tracing data acquisition setting field 400c of the initial setting screen 400 illustrated in FIG. 16 accepts this selection.

Still further, the image processing apparatus 24 configures digital embedding settings (S28). The digital embedding settings include a selection as to whether a detection of digitally embedded information is to be performed. The digital embedding settings further include setting of a processing program (e.g., acquiring an access log, printing the access log) that is executed when digital embedding is detected. Specifically, a digital embedding setting field 400d of the initial setting screen 400 illustrated in FIG. 16 accepts the selection and the setting of the processing program. After S28, the initial setting process ends.

Figure 18:
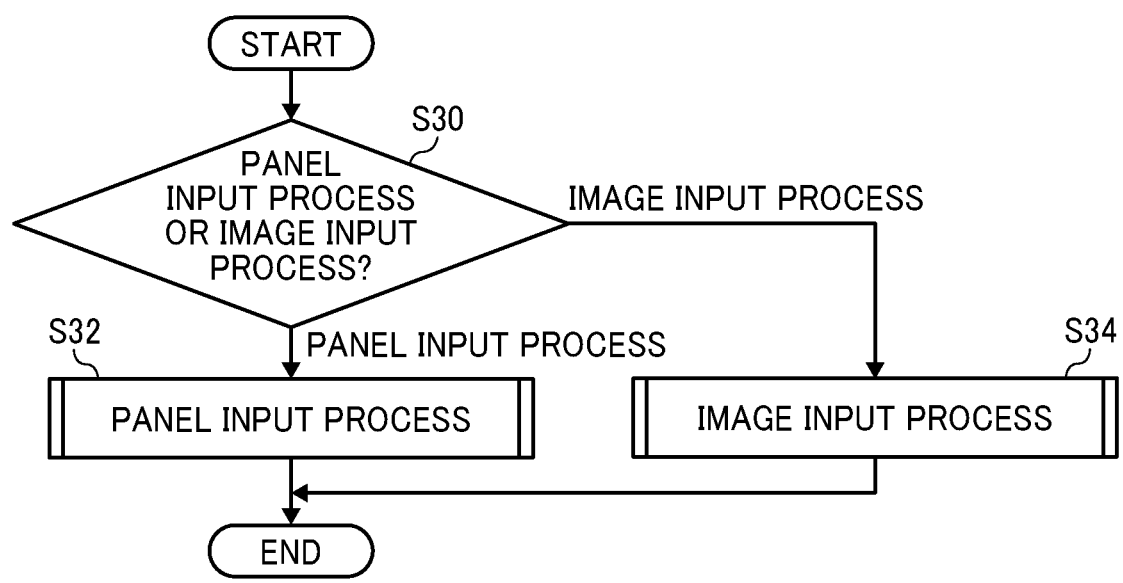
FIG. 18 is a flowchart illustrating steps in an execution process according to an embodiment of the present disclosure.

FIG. 18 is a flowchart illustrating steps in the execution process of S12 in FIG. 14. First, the image processing apparatus 24 determines whether the image processing apparatus 24 performs a panel input process or an image input process (S30). When the determination result indicates that the image processing apparatus 24 performs the panel input process, the operation proceeds to S32. By contrast, when the determination result indicates that the image processing apparatus 24 performs the image input process, the operation proceeds to S34.

At S32, the image processing apparatus 24 performs the panel input process. The panel input process includes configuring access settings to the database 40 and inputting data to the database 40. After the completion of the panel input process, the execution process ends. A description is given later of the panel input process with reference to FIG. 19.

Figure 19:
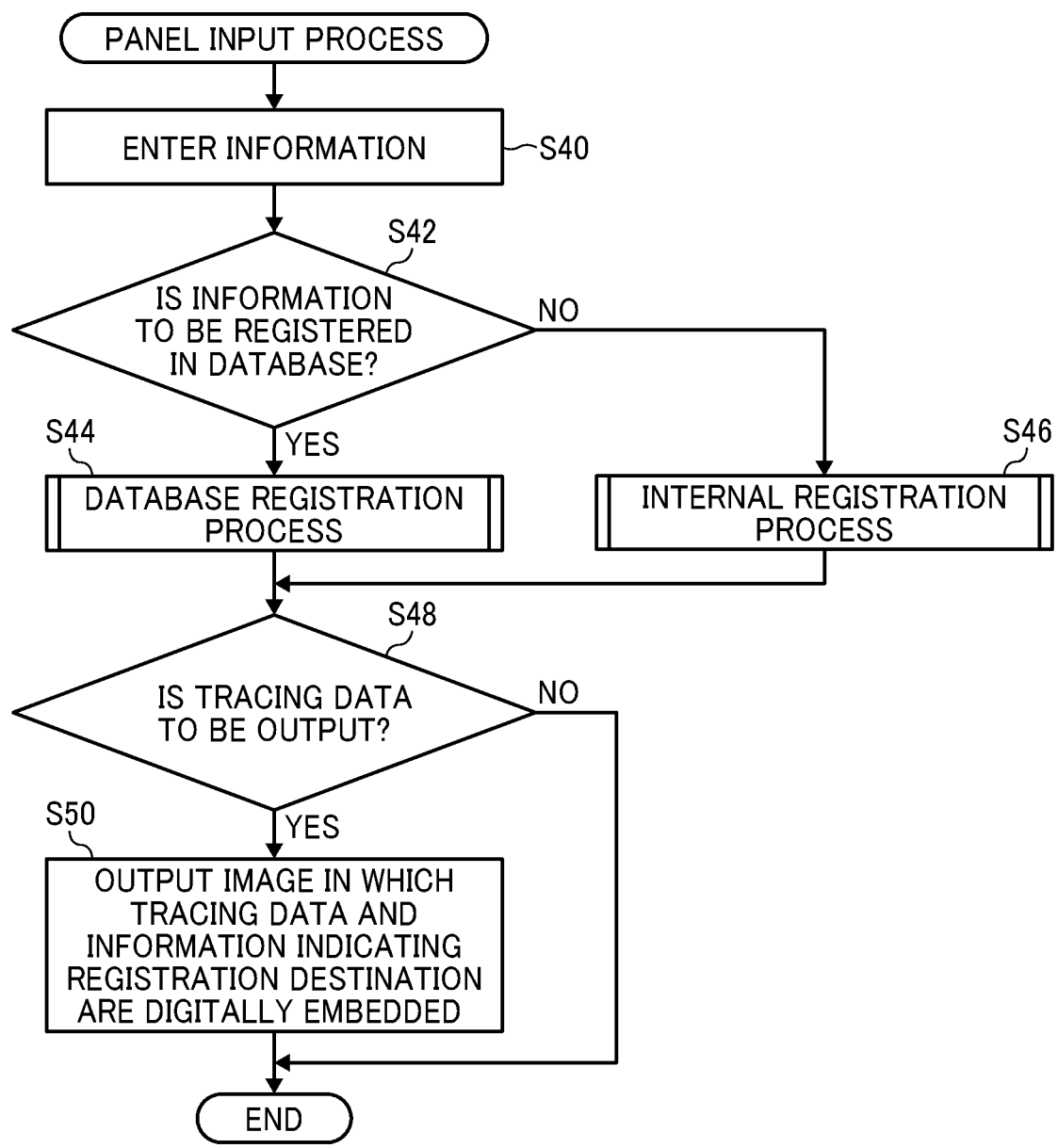
FIG. 19 is a flowchart illustrating steps in a panel input process according to an embodiment of the present disclosure.
Figure 24:
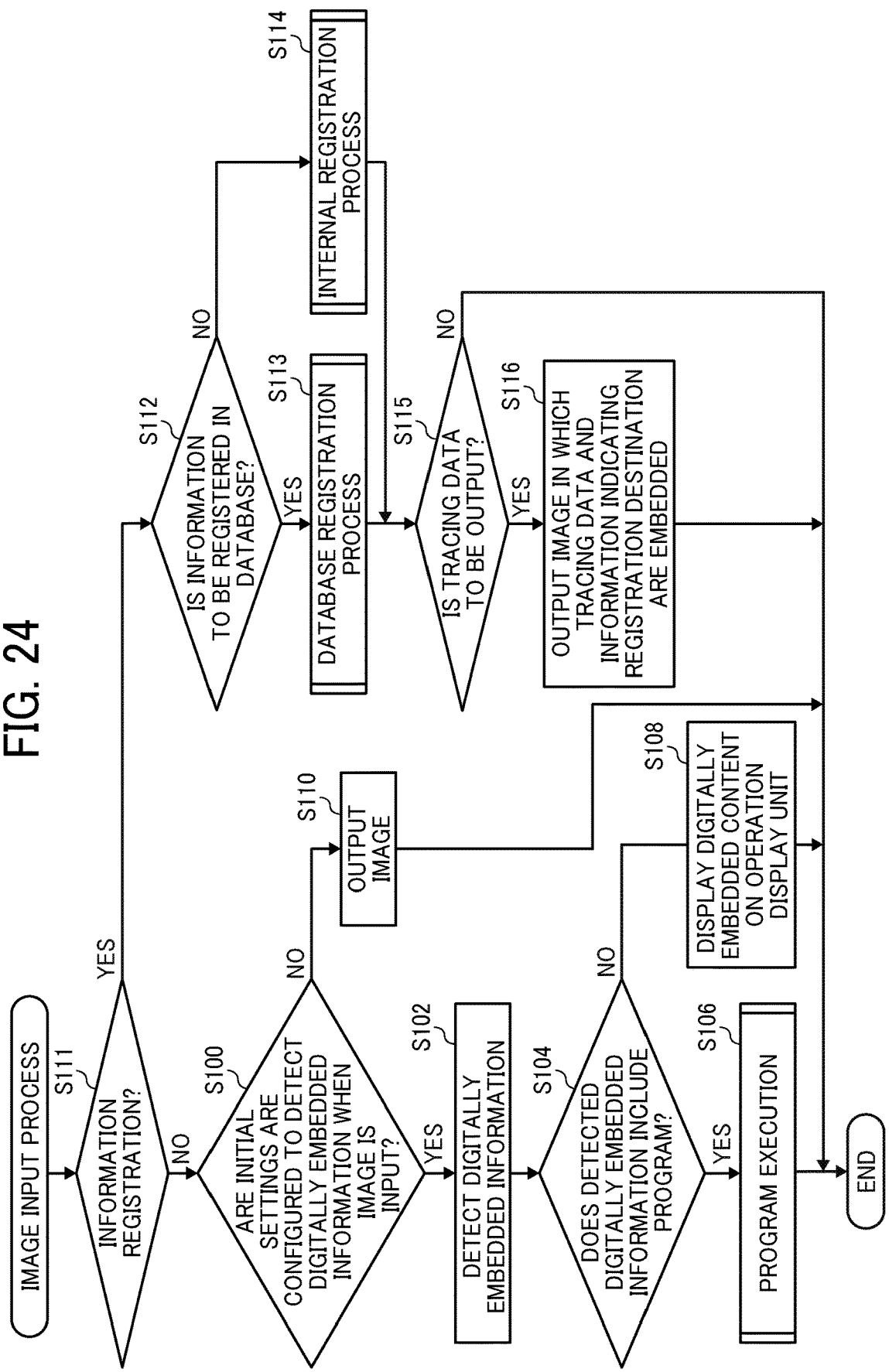
FIG. 24 is a flowchart illustrating steps in an image input process according to an embodiment of the present disclosure.

At S34, the image processing apparatus 24 performs the image input process. The image input process is processing of inputting an image in which access information to the database 40 is digitally embedded. After the completion of the image input process, the execution process ends. A description is given later of the image input process with reference to FIG. 24, FIG. 19 is a flowchart illustrating steps in the panel input process of S32 in FIG. 18. First, the image processing apparatus 24 accepts an input of information to be registered (S40).

Next, the image processing apparatus 24 refers to the information registration settings configured at the initial setting process (FIG. 15) to determine the information is to be registered in the database 40 (S42). In a case in which the settings configured at the initial setting process indicate that the information is to be registered in the database 40 (S42: YES), the operation proceeds to S44. In a case in which the settings configured in the initial setting process do not indicate that the information is to be registered in the database 40 (S42: NO), the operation proceeds to S46.

At S44, the image processing apparatus 24 performs a database registration process of registering the input information in the database 40. After S44, the operation proceeds to S48. A description is given later of the database registration process of S44 with reference to FIG. 21.

At S46, the image processing apparatus 24 performs an internal registration process of registering the input information in the image processing apparatus 24 itself. After S46, the operation proceeds to S48. A description is given later of the internal registration process of S46 with reference to FIG. 23.

At S48, the image processing apparatus 24 determines whether the tracing data Tc is to be output. Specifically, at S48, the image processing apparatus 24 determines that the tracing data Tc is to be output, in a case in which a destination in which the information is to be registered has an access log management function for managing an access log. In a case in which the image processing apparatus 24 determines that the tracing data Tc is to be output (S48: YES), the operation proceeds to S50. By contrast, in a case in which the image processing apparatus 24 determines that the tracing data Tc is not be output (S48: NO), the panel input process ends.

At S50, the image processing apparatus 24 outputs an image in which the tracing data Tc, the registration destination in which the input information is registered, and the program that is executed when the tracing data Tc is detected, are digitally embedded. Alternatively, the image processing apparatus 24 outputs the trace information on an operation screen. After S50, the panel input process ends.

Hereinafter, a description is given of the database registration process of S44 in FIG. 19 with reference to FIG. 21. First, the image processing apparatus 24 establishes communication between the image processing apparatus 24 and the database 40 that is designated as the registration destination in the information registration settings configured at S22 (S60).

Next, the image processing apparatus 2.4 checks whether communication is established between the image processing apparatus 24 and the database 40 (S62). In a case in which the communication is established (S62: YES), the operation proceeds to S64. By contrast, in a case in which the communication is not established (S62: NO), the operation proceeds to S76.

At S64, the image processing apparatus 24 checks whether the database 40 has an access log management function. In a case in which the database 40 has the access log management function (S64: YES), the operation proceeds to S66. In a case in which the database 40 does not have the access log management function (S64: NO), the operation proceeds to S72.

At S66, the image processing apparatus 24 performs a tracing data generation process of generating the tracing data Tc. A description is given later of the tracing data generation process with reference to FIG. 22.

Further, the image processing apparatus 24 uploads the generated tracing data Tc and the input information to the database 40 (S68).

Furthermore, the image processing apparatus 24 receives, from the database 40, a notification indicating that the tracing data Tc is associated with the access log of the input information (S70). After S70, the database registration process ends.

At S72, the image processing apparatus 24 inquires of the user whether only the registration of the information is to be performed. In a case in which only the registration of the information is to be performed (S72: YES), the operation proceeds to S74. By contrast, in a case in which not only the registration of the information is to be performed (S72: NO), the operation proceeds to S76.

At S74, the image processing apparatus 24 uploads the input information to the database 40. After S74, the database registration process ends.

At S76, the image processing apparatus 24 displays, on the operation display unit 2 (touch panel), an error message indicating that communication has not been established. After S76, the database registration process ends.

Hereinafter, a description is given of the tracing data generation process of S66 in FIG. 21 with reference to FIG. 22. First, the image processing apparatus 24 refers to the settings configured in the initial setting process (FIG. 15) to determine whether the tracing data Tc is to be generated internally (by the image processing apparatus 24) (S80). In a case in which the image processing apparatus 24 determines that the tracing data Tc is to be generated by the image processing apparatus 24 (S80: YES), the image processing apparatus 24 generates the tracing data Tc (S82), and the operation proceeds to S86.

At S86, the image processing apparatus 24 checks whether there is the same tracing data Tc as the generated tracing data Ic in an information registration destination. In a case in which the image processing apparatus 24 determines that the same tracing data Tc as the generated tracing data Tc is present in the information registration destination (S86: YES), the operation returns to S82. In this case, the image processing apparatus 24 again generates the tracing data Tc (S82). In a case in which the image processing apparatus 24 determines that the same tracing data Tc as the generated tracing data Tc is not present in the information registration destination (S86: NO), the tracing data generation process ends.

By contrast, in a case in which the settings configured in the initial setting process indicates that the tracing data Tc is to be generated externally (S80: NO), the operation proceeds to S84.

At S84, the image processing apparatus 24 instructs an external device that generates the tracing data Tc to generate the tracing data Tc, and receives the generated tracing data Tc. After S84, the tracing data generation process ends.

Figure 23:
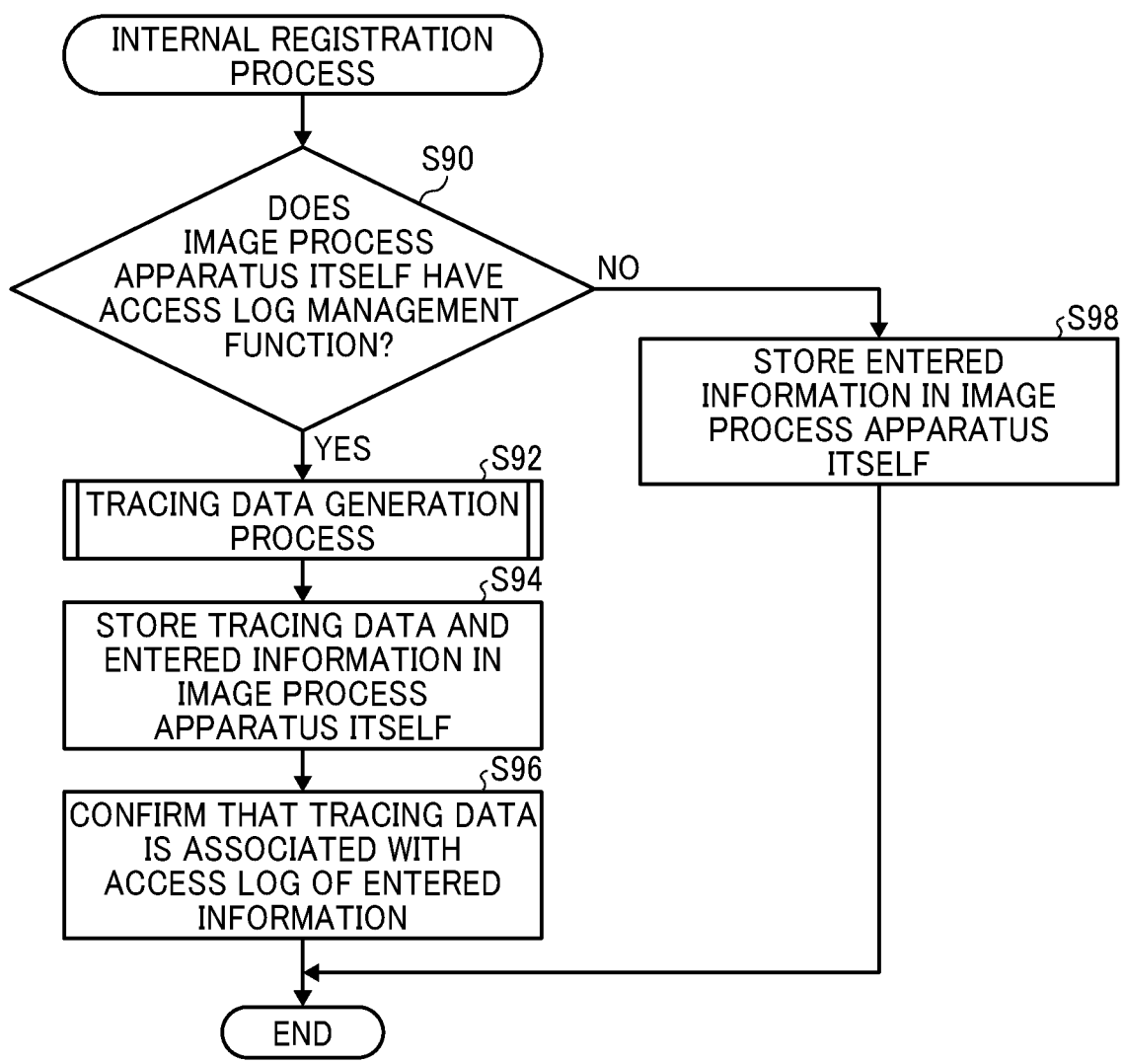
FIG. 23 is a flowchart illustrating steps in an internal registration process according to an embodiment of the present disclosure.

Hereinafter, a description is given of the internal registration process of S46 in FIG. 19 with reference to FIG. 23. First, the image processing apparatus 24 checks whether the image processing apparatus 24 itself has an access log management function (S90). In a case in which the image processing apparatus 24 has the access log management function (S90: YES), the operation proceeds to S92. By contrast, in a case in which the image processing apparatus 24 does not have the access log management function (S90: NO), the operation proceeds to S98.

At S92, the image processing apparatus 24 performs the tracing data generation process of generating the tracing data Tc. The image processing apparatus 24 generates the tracing data Tc in substantially the same manner as described above with reference to FIG. 22.

Further, the image processing apparatus 24 stores the generated tracing data Ic and the input information internally (in the image processing apparatus 24) (S94).

Furthermore, the image processing apparatus 24 confirms that the tracing data Tc is associated with the access log of the input information (S96). After S96, the internal registration process ends.

At S98, the image processing apparatus 24 stores the input information internally (in the image processing apparatus 24). After S98, the internal registration process ends.

Hereinafter, a description is given of how the panel input process is performed with reference to FIG. 20. FIG. 20 is a view illustrating an example of an information input screen 402 displayed on a touch panel that constitutes the operation display unit 2 of the image processing apparatus 24 when the pane input process is performed.

As illustrated in FIG. 20, after the acceptance of information 402a that is to be registered, the image processing apparatus 24 accepts a designation of a destination to which the information 402a is to be uploaded through the information input screen 402. FIG. 20 illustrates an example in which ABC is entered in a registration destination field 402b to designate that the information 402a is to be registered in a server of ABC.

Next, the image processing apparatus 24 accepts, in an access log access sheet output field 402c, a selection whether to output the tracing data Tc used for referring to the trace result. FIG. 20 illustrates an example in which an output of an image containing the tracing data Tc embedded therein is designated. When the information input screen 402 accepts a selection of a CONTINUE key 402d, the upload of the information 402a is started.

FIG. 24 is a flowchart illustrating steps in the image input process of S34 in FIG. 18. First, when an operation is input, the image processing apparatus 24 checks the operation is an information registration of inputting an image as the registration information (S111). In a case in which the input operation is the information registration (S111: YES), the operation proceeds to S112. By contrast, in a case in which the input operation is not the information registration (S111: NO), the operation proceeds to S100.

At S112, the image processing apparatus 24 checks whether the information is to be registered in the database 40. In a case in which the information is to be registered in the database 40 (S112: YES), the operation proceeds to S113. In a case in which the information is to be registered in a resource other than the database 40 (S112: NO), the operation proceeds to S114.

At S113, the image processing apparatus 24 performs the database registration process of registering the input information in the database 40. Then, the operation proceeds to S115. The database registration process is performed in substantially the similar manner as described above with reference to FIG. 21, and the description thereof is omitted.

At S114, the image processing apparatus 24 performs the internal registration process of registering the input information in the image processing apparatus 24 itself. Then, the operation proceeds to S115. The internal registration process is performed in substantially the similar manner as described above with reference to FIG. 23, and the description thereof is omitted.

At S115, the image processing apparatus 24 determines whether the tracing data Tc is to be output. Specifically, at S115, the image processing apparatus 24 determines that the tracing data Tc is to be output, in a case in which a destination in which the information is to be registered has an access log management function for managing an access log. In a case in which the image processing apparatus 24 determines that the tracing data Tc is to be output (S115: YES), the operation proceeds to S116. By contrast, in a case in which the image processing apparatus 24 determines that the tracing data Tc is not be output (S115: NO), the image input process ends.

At S116, the image processing apparatus 24 outputs an image in which the trace information is digitally embedded. Alternatively, the image processing apparatus 24 outputs the trace information on an operation screen. Then, the image input process ends.

At S100, the image processing apparatus 24 checks whether the settings configured in the initial setting process (FIG. 15) indicate that a detection of digitally embedded information is to be performed. In a case in which the settings indicates that the detection of digitally embedded information is to be performed (S100: YES), the operation proceeds to S102, By contrast, in a case in the settings indicates that the detection of digitally embedded information is not to be performed (S100: NO), the operation proceeds to S110.

At S102, the image processing apparatus 24 detects digitally embedded information (the tracing data Tc) from the input image.

Further, the image processing apparatus 24 checks whether a program is detected as the digitally embedded information (S104). In a case in which the program is detected as the digitally embedded information (S104: YES), the operation proceeds to S106. By contrast, in a case in the program is not detected as the digitally embedded information (S104: NO), the operation proceeds to S108.

At S106, the image processing apparatus 24 executes the program detected as the digitally embedded information. A description is given later of an example of processing performed by the program detected as the digitally embedded information when executed with reference to FIG. 25. After the completion of execution of the program, the image input process ends.

At S108, the image processing apparatus 24 displays, on the operation display unit 2, digitally embedded contents such as a content of the tracing data Tc and a code of an access destination that has been set when outputted. After S108, the image input process ends.

At S110, the image processing apparatus 24 outputs the input image itself. After S110, the image input process ends.

Figure 25:
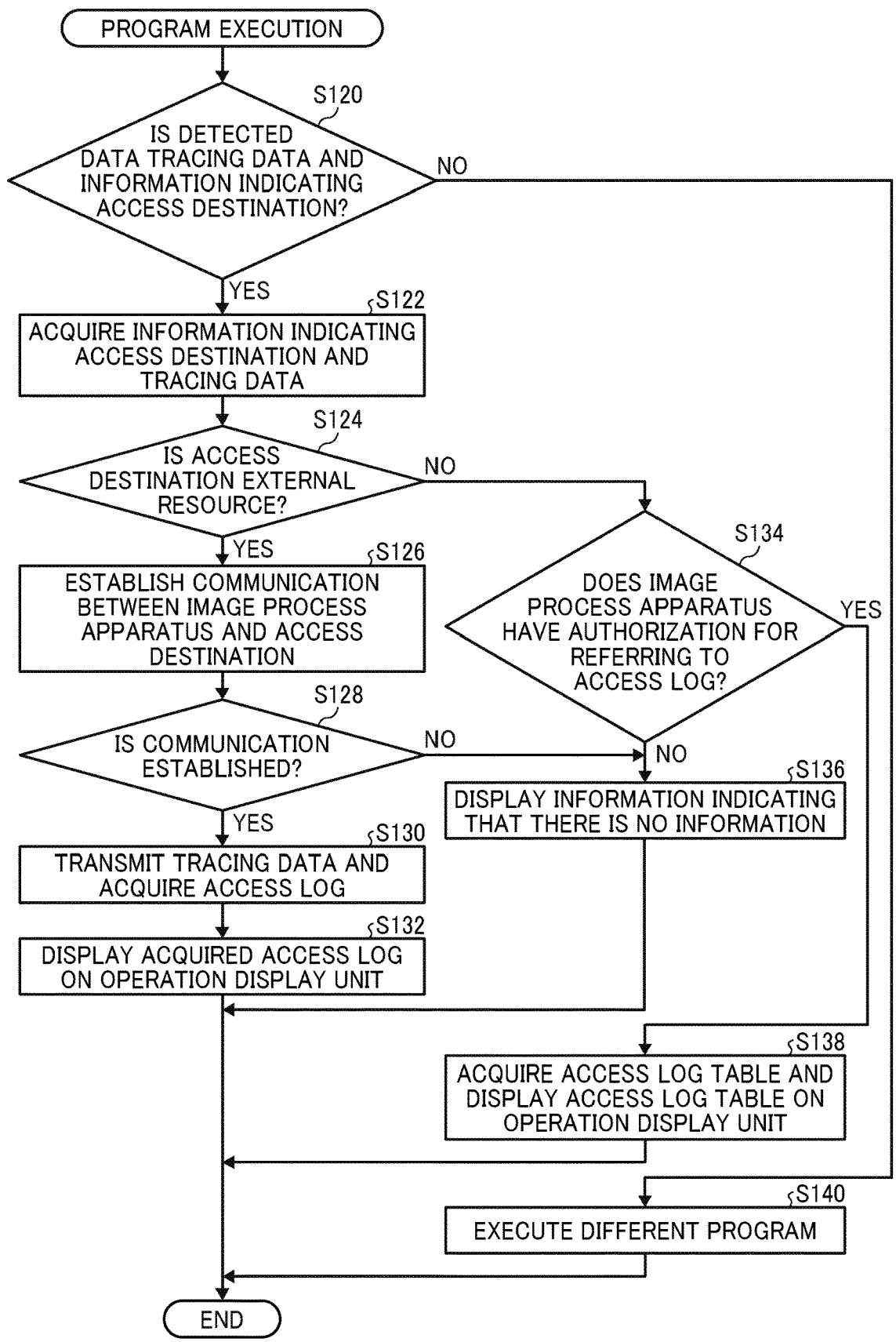
FIG. 25 is a flowchart illustrating steps in processing performed by the image processing apparatus according to instructions of a program according to an embodiment of the present disclosure.

FIG. 25 is a flowchart illustrating steps in the processing of S106 in FIG. 24 performed by the image processing apparatus 24 according to instructions of the digitally embedded program, when the image processing apparatus 24 detects the tracing data Tc. FIG. 25 illustrates an example of the program that, when executed, causes the image processing apparatus 24 to acquire the trace result.

First, at S120, the image processing apparatus 24 checks whether the detected digitally embedded information is the tracing data Tc and the access destination. In a case in which the detected digitally embedded information is the tracing data Tc and the access destination (S120: YES), the operation proceeds to S122. By contrast, in a case in the detected digitally embedded information is information other than the tracing data Tc and the access destination (S120: NO), the operation proceeds to S140.

At S122, the image processing apparatus 24 acquires the tracing data Tc and the access destination from the detected digitally embedded information.

Further, the image processing apparatus 24 checks whether the acquired access destination is an outside resource (S124). In a case in which the access destination is an outside resource (S124: YES), the operation proceeds to S126. By contrast, in a case in the access destination is not an outside resource (S124: NO), the operation proceeds to S134.

At S126, the image processing apparatus 24 establishes communication between the image processing apparatus 24 and the access destination.

Next, the image processing apparatus 24 checks whether communication is established between the image processing apparatus 24 and the access destination (S128). In a case in which the communication is established (S128: YES), the operation proceeds to S130. By contrast, in a case in which the communication is not established (S128: NO), the operation proceeds to S136.

At S130, the image processing apparatus 24 transmits the tracing data Tc to the access destination and acquires the trace result from the access destination.

Figure 13D:
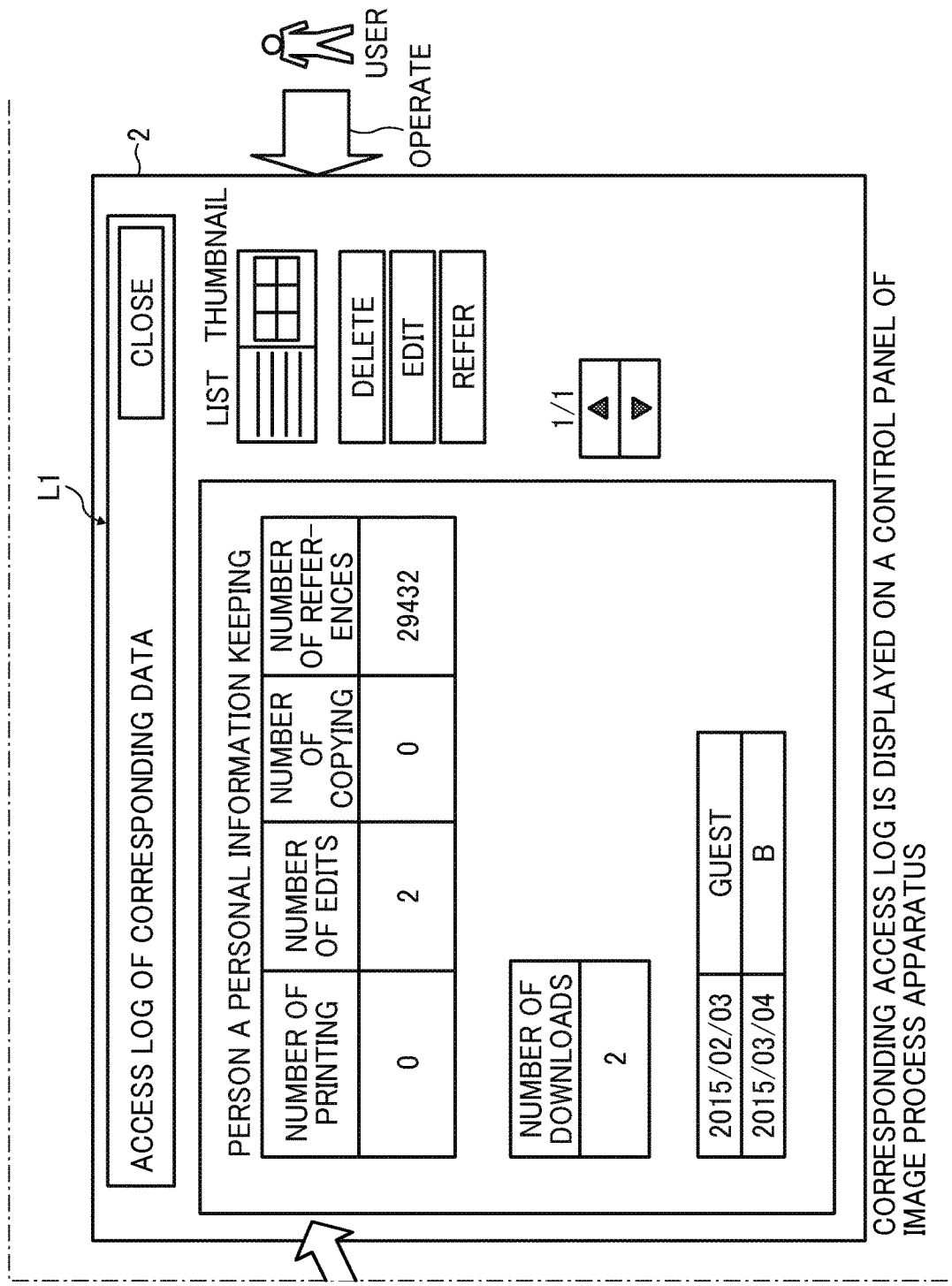

Further, the image processing apparatus 24 displays the acquired access log on the operation display unit 2 (S132). For example, at S132, the access log L1 as illustrated in FIG. 13D is displayed on a touch panel that constitutes the operation display unit 2 of the image processing apparatus 24. After S132, the processing performed the image processing apparatus 24 according to instructions of the digitally embedded program ends.

At S140, the image processing apparatus 24 executes a different program. After S140, the processing performed by the image processing apparatus 24 according to instructions of the digitally embedded program ends. It should be noted that the different program executed at S140 does not relate to the present embodiment, and therefore a description thereof is omitted.

At S134, the image processing apparatus 24 determines whether the image processing apparatus 24 itself has authorization to refer to an access log with the tracing data Tc. In a case in which the image processing apparatus 24 has authorization to refer to an access log (S134: YES), the operation proceeds to S138. By contrast, in a case in the image processing apparatus 24 does not have authorization to refer to an access log (S134: NO), the operation proceeds to S136.

In a case in which the image processing apparatus 24 has authorization to refer to an access log of the information registered in the image processing apparatus 24 itself (S134: YES), the image processing apparatus 24 acquires the access log corresponding to the tracing data Tc in the access log table T2 (FIG. 12B), and displays the acquired access log on the operation display unit 2 (S138). After S138, the processing performed according to instructions of the program ends.

In a case in which the image processing apparatus 24 does not have authorization to refer to an access log of the information registered in the image processing apparatus 24 itself (S134: NO), or, in a case in which the communication is not established between the image processing apparatus 24 and the access destination (S128: NO), the image processing apparatus 24 displays information indicating no information is present on the operation display unit 2 (S136). After S136, the processing performed according to instructions of the program ends.

Figure 26:
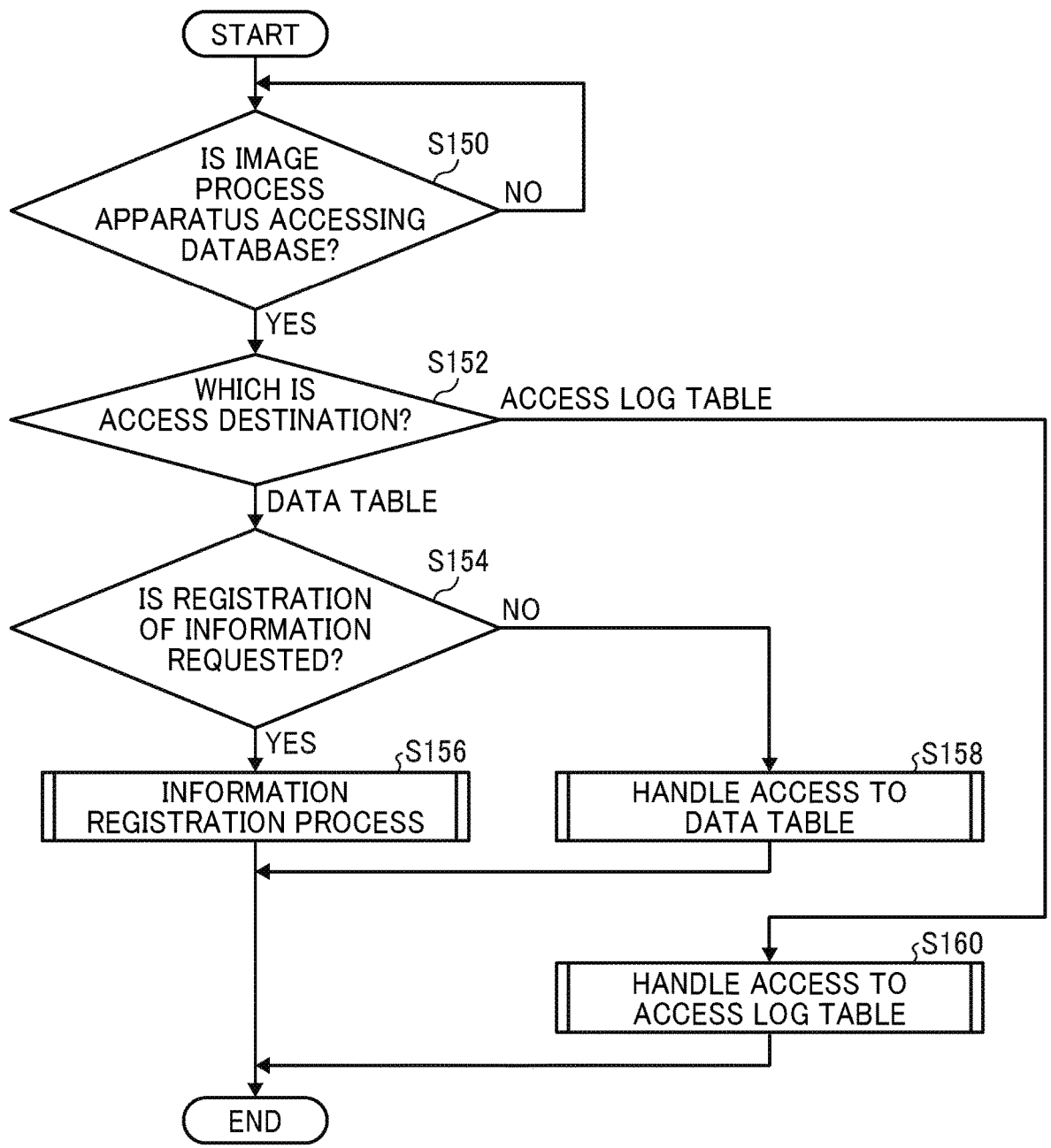
FIG. 26 is a flowchart illustrating an operation performed by the database in which input information is registered according to an embodiment of the present disclosure.

Hereinafter, with reference to FIG. 26, a description is given of an operation performed by the database 40 or the image processing apparatus 24 in which the input information is registered, when the image processing system 100 performs the operation illustrated in FIG. 14. FIG. 26 illustrates an example of the processing performed in a case in which the input information has been registered externally (in the database 40). In a case in which the input information has been registered internally (in the image processing apparatus 24), substantially the similar processing as described below with FIG. 26 is performed for the image processing apparatus 24.

First, the database 40 checks whether the image processing apparatus 24 is accessing the database 40 (S150). In a case in which the image processing apparatus 24 is accessing database 40 (S150: YES), the operation proceeds to S152. By contrast, in a case in which an access from the image processing apparatus 24 is not detected (S150: NO), the operation repeats S150.

At S152 the database 40 checks whether the image processing apparatus 24 is accessing the data table T1 (FIG. 12A) or the access log table T2 (FIG. 12B). In a case in which the image processing apparatus 24 is accessing the data table T1 the operation proceeds to S154. By contrast, in a case in which the image processing apparatus 24 is accessing the access log table T2, the operation proceeds to S160.

At S154, the database 40 checks whether the image processing apparatus 24 is requiring a registration of the input information. In a case in which the image processing apparatus 24 is requiring the registration of the information (S154: YES), the operation proceeds to S156. By contrast, in a case in which the image processing apparatus 24 is not requiring the registration of the information (S154: NO), the operation proceeds to S158.

At S156, the database 40 performs a process of registering the information. After S156, the operation of FIG. 26 ends. A description is given later of the process of registering the information performed at S156 with reference to FIG. 27.

At S158, the database 40 performs an operation for handling access to the data table T1. After S158, the operation of FIG. 26 ends. A description is given later of the operation for handling the access to the data table T1 performed at S158 with reference to FIG. 28.

At S160, the database 40 performs an operation for handling access to the access log table T2. After S160, the operation of FIG. 26 ends. A description is given later of the operation of handling the access to the access log table T2 performed at S160 with reference to FIG. 29.

Figure 27:
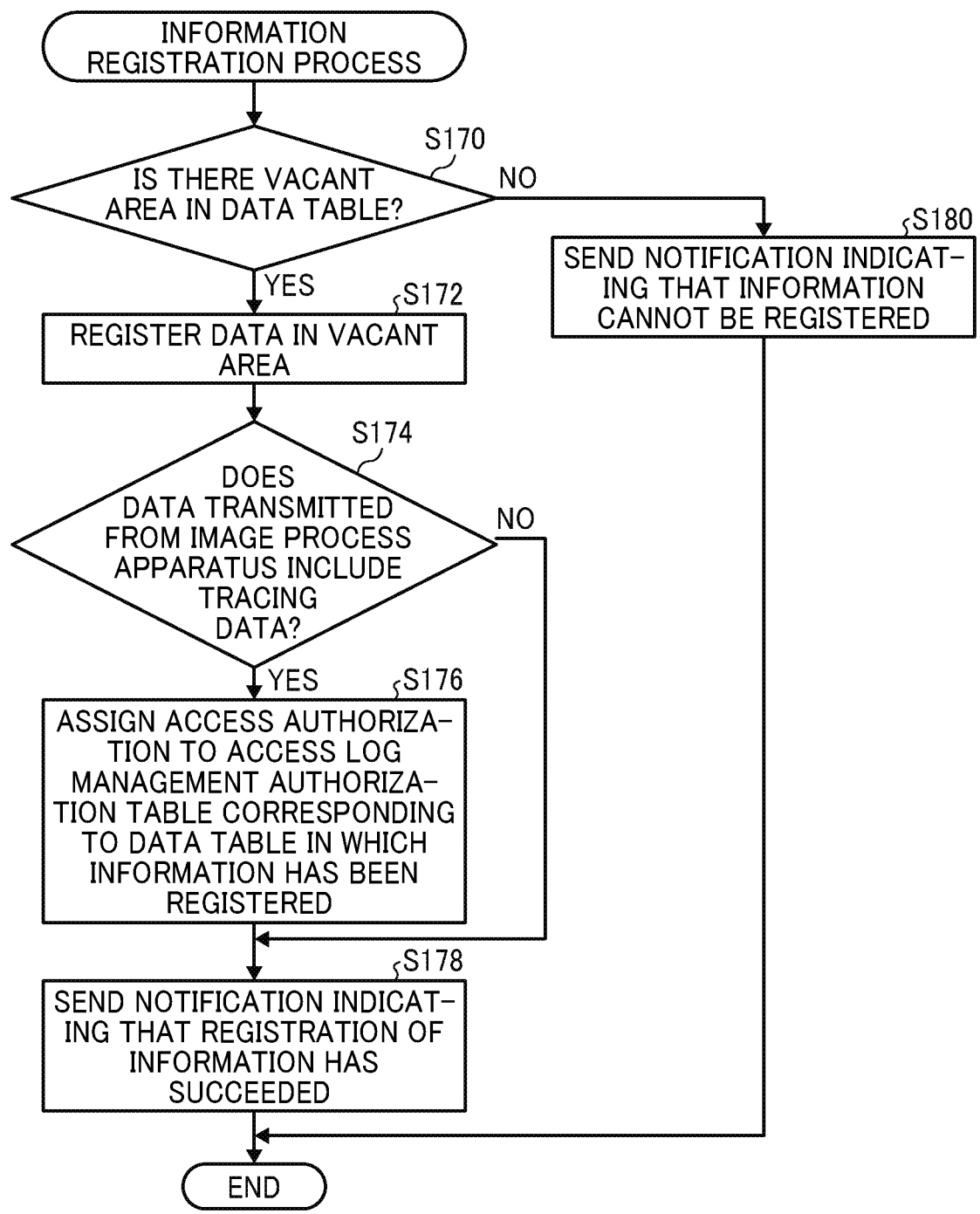
FIG. 27 is a flowchart illustrating steps in an operation of registering information performed by the database according to an embodiment of the present disclosure.

FIG. 27 is a flowchart illustrating steps in the operation for registering the information performed by the image processing apparatus 24 or the database 40. A description in given hereinafter assuming that the database 40 performs steps in the flowchart of FIG. 27. First, the database 40 checks whether in the data table T1, there is a vacant area into which new information can be written (S170). In a case in which there is a vacant area in the data table T1 (S170: YES), the operation proceeds to S172. By contrast, in a case in which there is no vacant area in the data table T1 (S170: NO), the operation proceeds to S180.

At S172, the database 40 writes the information into the vacant area in the data table T1.

Further, the database 40 checks whether data transmitted from the image processing apparatus 24 includes the tracing data Tc (S174). In a case in which the tracing data Tc is included (S174: YES), the operation proceeds to S176. By contrast, in a case in which the tracing data Tc is not included (S174: NO), the operation proceeds to S178.

At S176, the database 40 registers the tracing data Tc in the access log management authorization table T3 (FIG. 12A) corresponding to the data table T1 into which the information is written to assign access authorization.

At S178, the database 40 sends, to the image processing apparatus 24, a notification indicating that the information has been successfully registered. After S178, the processing of registering the information ends.

At S180, the database 40 sends, to the image processing apparatus 24, a notification indicating that the information cannot be registered. After S180, the processing of registering the information ends.

Figure 28:
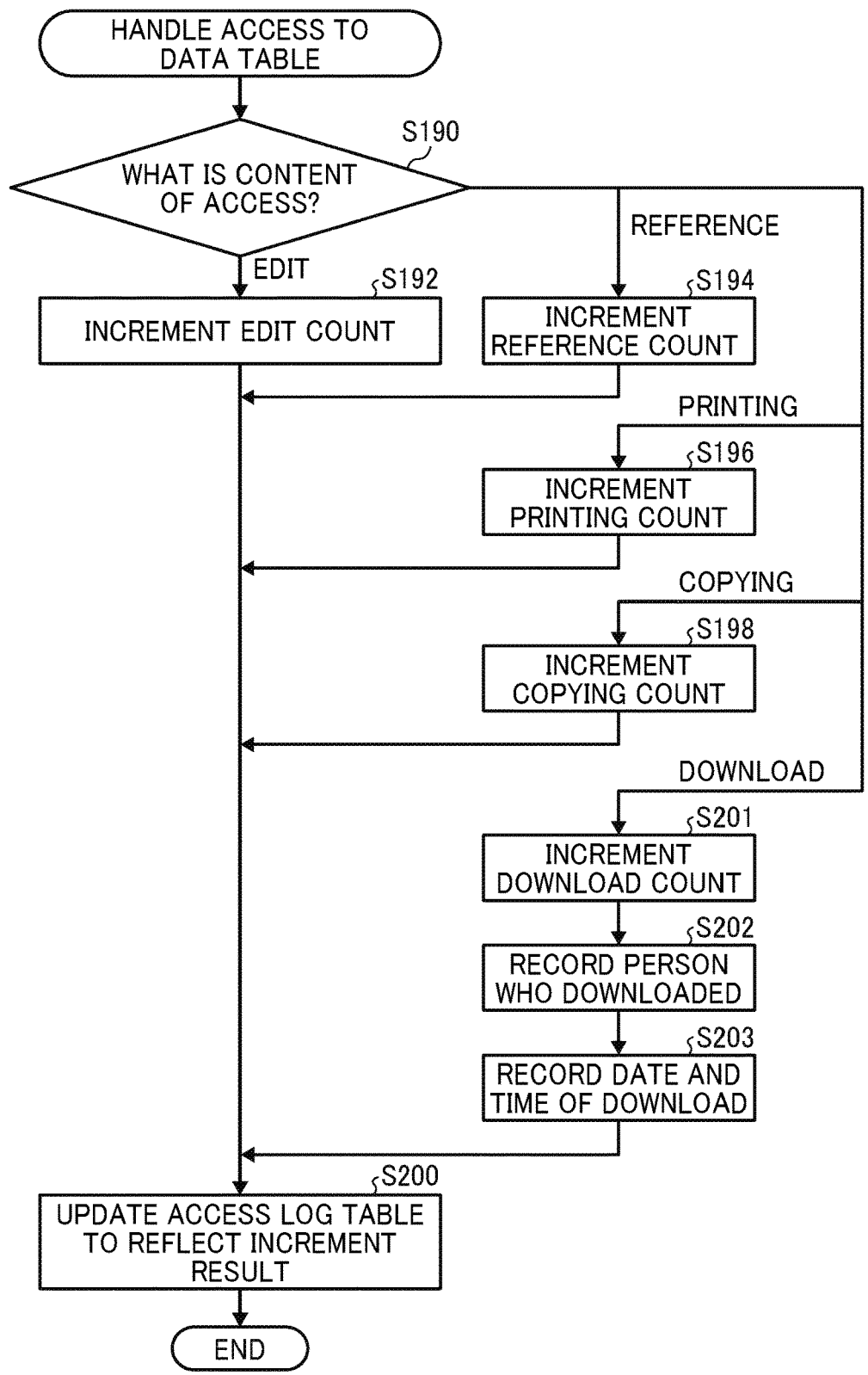
FIG. 28 is a flowchart illustrating steps in an operation of handling a data table performed by the database according to an embodiment of the present disclosure.

FIG. 28 is a flowchart illustrating steps in an operation for handling access to the data table T1 performed by the image processing apparatus 24 or the database 40. A description in given hereinafter assuming that the database 40 performs steps in the flowchart of FIG. 28. First, the database 40 checks a content of the access from the image processing apparatus 24 (S190). In a case in which the content of the access is "edit", the operation proceeds to S192. In a case in which the content of the access is "refer", the operation proceeds to S194. In a case in which the content of the access is "printing", the operation proceeds to S196. In a case in which the content of the access is "copying", the operation proceeds to S198. In a case in which the content of the access is "download", the operation proceeds to S201.

At S192, the database 40 increments an edit count as the number of edits.

At S194 the database 40 increments a reference count as the number of references.

At S196, the database 40 increments a print count as the number of printings.

At S198, the database 40 increments a copy count as the number of copying.

At S201, the database 40 increments a download count as the number of downloads. Further, the database 40 records who downloaded the registered information (S202) and a download date (S203).

Furthermore, the database 40 updates the access log table T2 to reflect the increments of the number of edits, the number of references, the number of printings, the number of copying, and the number of downloads, the person who downloaded the registered information, and the download date (S200). After S200, the operation for handling the access to the data table T1 ends.

Figure 29:
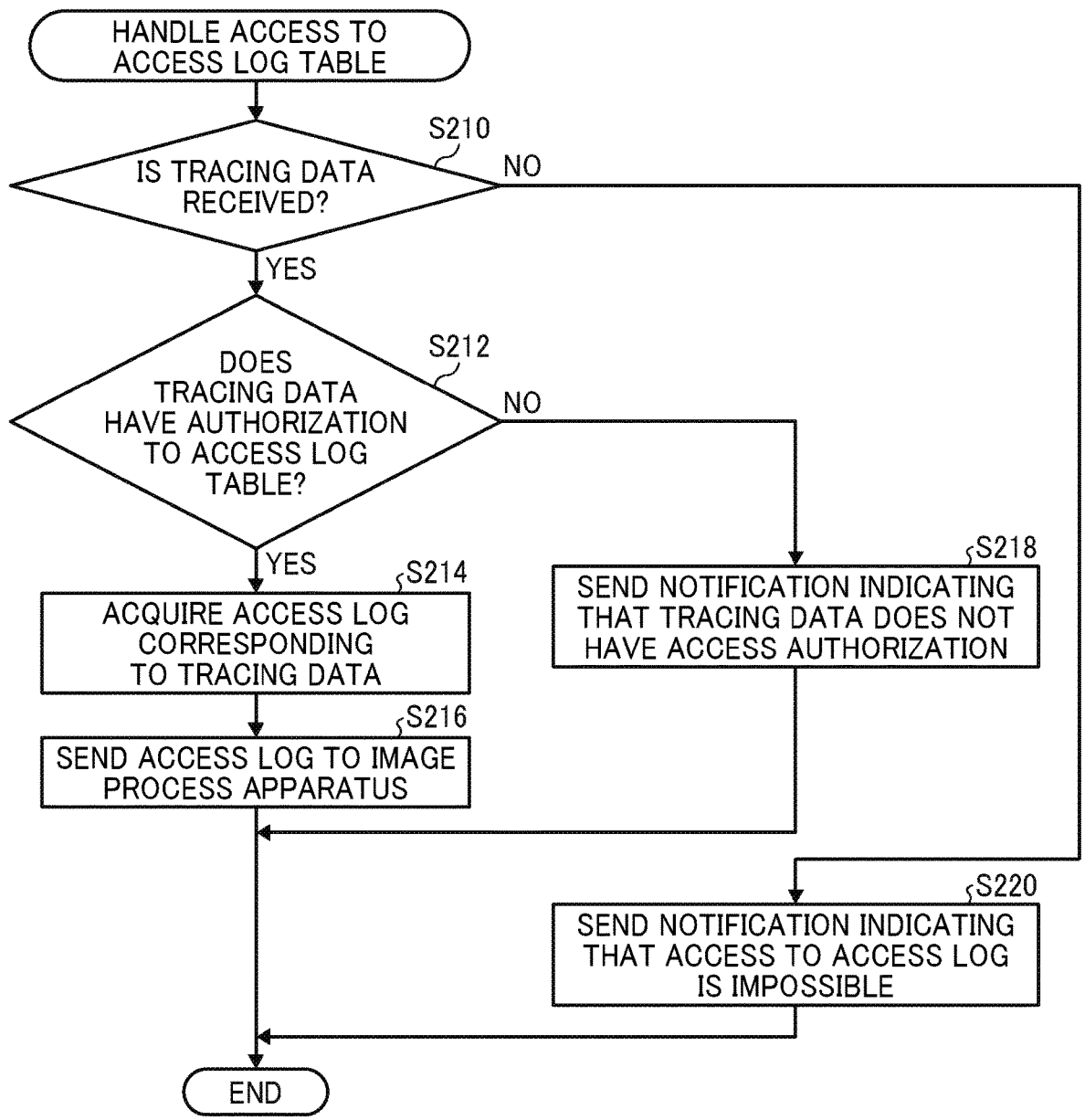
FIG. 29 is a flowchart illustrating steps in an operation of handling access to an access log table performed by the database according to an embodiment of the present disclosure.

FIG. 29 is a flowchart illustrating steps in the operation for handling access to the access log table T2, performed by the image processing apparatus 24 or the database 40. A description in given hereinafter assuming that the database 40 performs steps in the flowchart of FIG. 29. First, the database 40 checks whether the tracing data Tc is received from the image processing apparatus 24 (S210). In a case in which the tracing data Tc is received (S210: YES), the operation proceeds to S212. By contrast, in a case in which the tracing data Tc is not received (S210: NO), the operation proceeds to S220.

At S212, the database 40 refers to the access log management authorization table T3 to check whether the received tracing data Tc has access authorization to the access log table T2. In a case in which the received tracing data has access authorization (S212: YES), the operation proceeds to S214. By contrast, in a case in which the received tracing data does not have access authorization (S212: NO), the operation proceeds to S218.

At S214, the database 40 acquires the access log corresponding to the tracing data Tc from the access log table T2.

Further, the database 40 sends the acquired access log to the image processing apparatus 24 (S216). After S216, the operation for handling the access to the access log table T2 ends.

At S218, the database 40 sends, to the image processing apparatus 24, a notification indicating that the received tracing data does not have access authorization. After S218, the processing of handling the access to the access log table T2 ends.

At S220, the database 40 sends, to the image processing apparatus 24, a notification indicating that access to the access log is impossible. After S220, the processing of handling the access to the access log table T2 ends.

Figure 30:
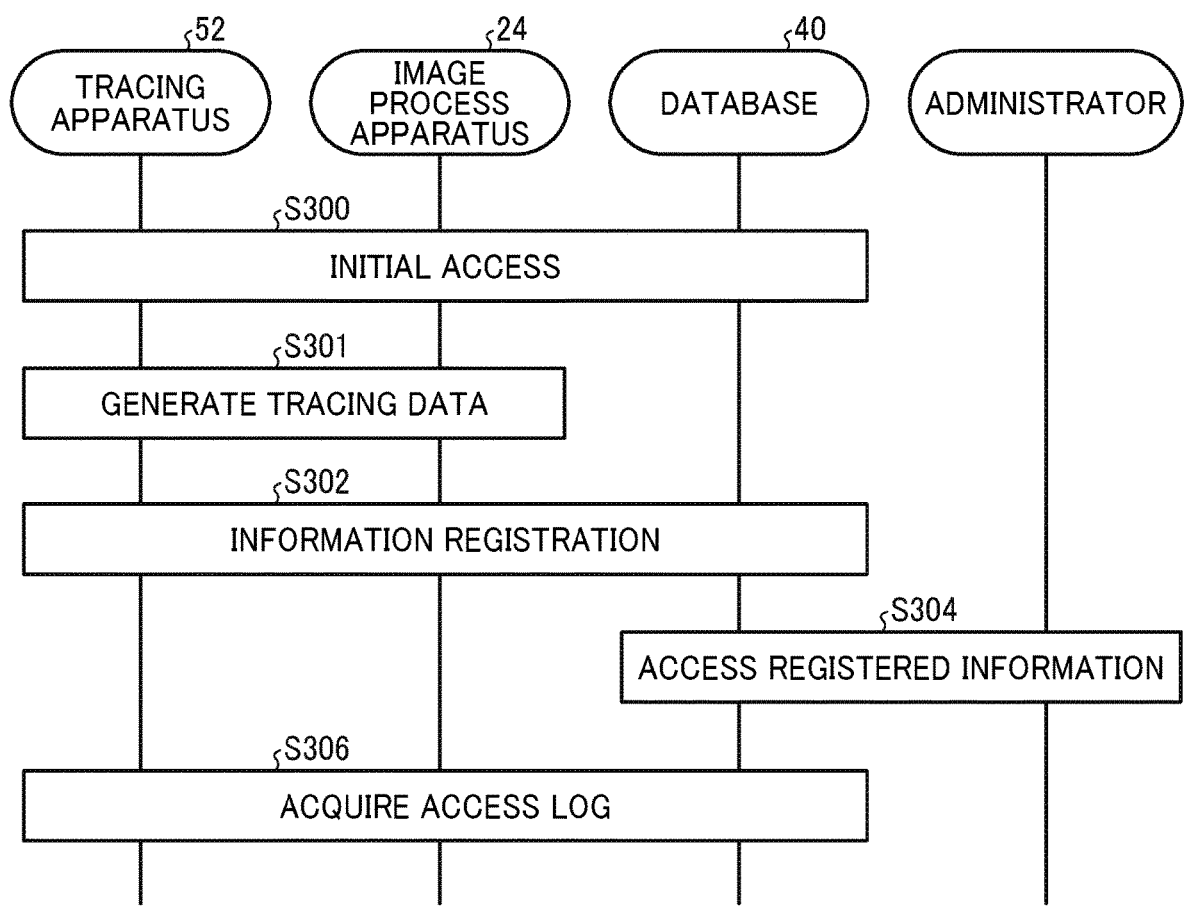
FIG. 30 is a sequence diagram illustrating an overview of a situation where information flows between the image processing apparatus, the database, the tracing apparatus, and an administrator according to an embodiment of the present disclosure.

Hereinafter, with reference to drawings, a description is given of information flows between the image processing apparatus 24, the database 40, the tracing apparatus 52 and an administrator in sequence. FIG. 30 is a sequence diagram illustrating an overview of a situation where information flows between the image processing apparatus 24, the database 40, the tracing apparatus 52, and the administrator. Hereinafter, a description is given of a case in which information is registered outside the image processing apparatus 24. However, also in a case in which the information is registered in the image processing apparatus 24 itself, the information flows in substantially the similar manner.

As illustrated in FIG. 30, when starting a registration of information, at first, an initial access occurs from the image processing apparatus 24 to the database 40 and the tracing apparatus 52 (S300). A detailed description is given later of S300 with reference to FIG. 31.

Next, before actually performing the information registration, an access occurs for generation of the trace information Tc between the image processing apparatus 24 and the tracing apparatus 52 (S301).

Next, when actually performing the information registration, information flows between the image processing apparatus 24, the tracing apparatus 52 and the database 40 (S302). A detail description is given later of S302 with reference to FIG. 32.

The administrator accesses the database 40 as needed to perform an operation, such as editing, reference, printing and copying, on the registered information (S304). A detailed description is given later of S304 with reference to FIG. 33.

Next, when acquiring the trace result, the image processing apparatus 24 exchanges necessary information with the database 40 and the tracing apparatus 52 (S306). A detailed description is given later of S306 with reference to FIG. 34.

Figure 31:
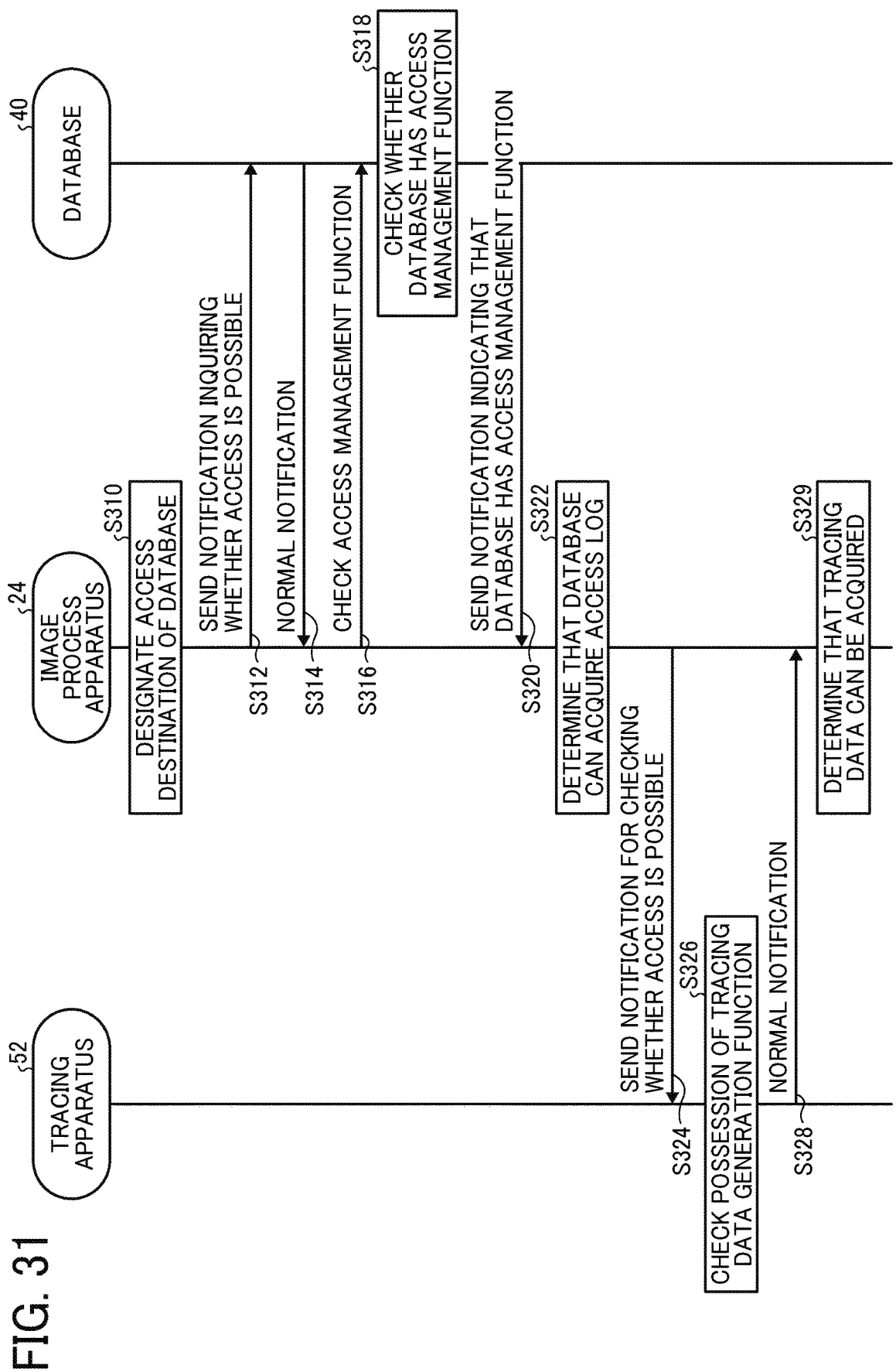
FIG. 31 is a sequence diagram illustrating information flows in an initial access between the image processing apparatus, the database and the tracing apparatus according to an embodiment of the present disclosure.

FIG. 31 is a sequence diagram illustrating information flows in the initial access of S300 in FIG. 30 between the image processing apparatus 24, the database 40 and the tracing apparatus 52.

First, the image processing apparatus 24 designates an access destination of the database 40 (S310).

Next, the image processing apparatus 24 sends, to the database 40, a notification (an access capability inquiring notification) checking whether the image processing apparatus 24 can access the database 40 (S312).

The database 40 sends, to the image processing apparatus 24, a notification (normal notification) indicating that the image processing apparatus 24 can access the database 40 (S314).

Further, the image processing apparatus 24 sends, to the database 40, a notification (an access management inquiry) inquiring whether the database 40 has an access management function (S316).

In response to receiving the inquiry from the image processing apparatus 24, the database 40 checks whether the database 40 has the access management function (S318).

The database 40 sends, to the image processing apparatus 24, notification indicating that the database 40 has the access management function (S320).

In response to receiving the notification from the database 40, the image processing apparatus 24 determines that the database 40 can acquire an access log (S322).

Next, the image processing apparatus 24 sends, to the tracing apparatus 52, a notification (an access capability inquiring notification) inquiring whether the image processing apparatus 24 can access the tracing apparatus 52 (S324).

In response to receiving the notification, the tracing apparatus 52 checks whether the tracing apparatus 52 has a tracing data generation function (S326). The tracing apparatus 52 sends, to the image processing apparatus 24, a notification (normal notification) indicating that the image processing apparatus 24 can access the tracing apparatus 52 (S328).

In response to receiving the normal notification, the image processing apparatus 24 determines that the tracing data Tc can be acquired (S329).

Figure 21:
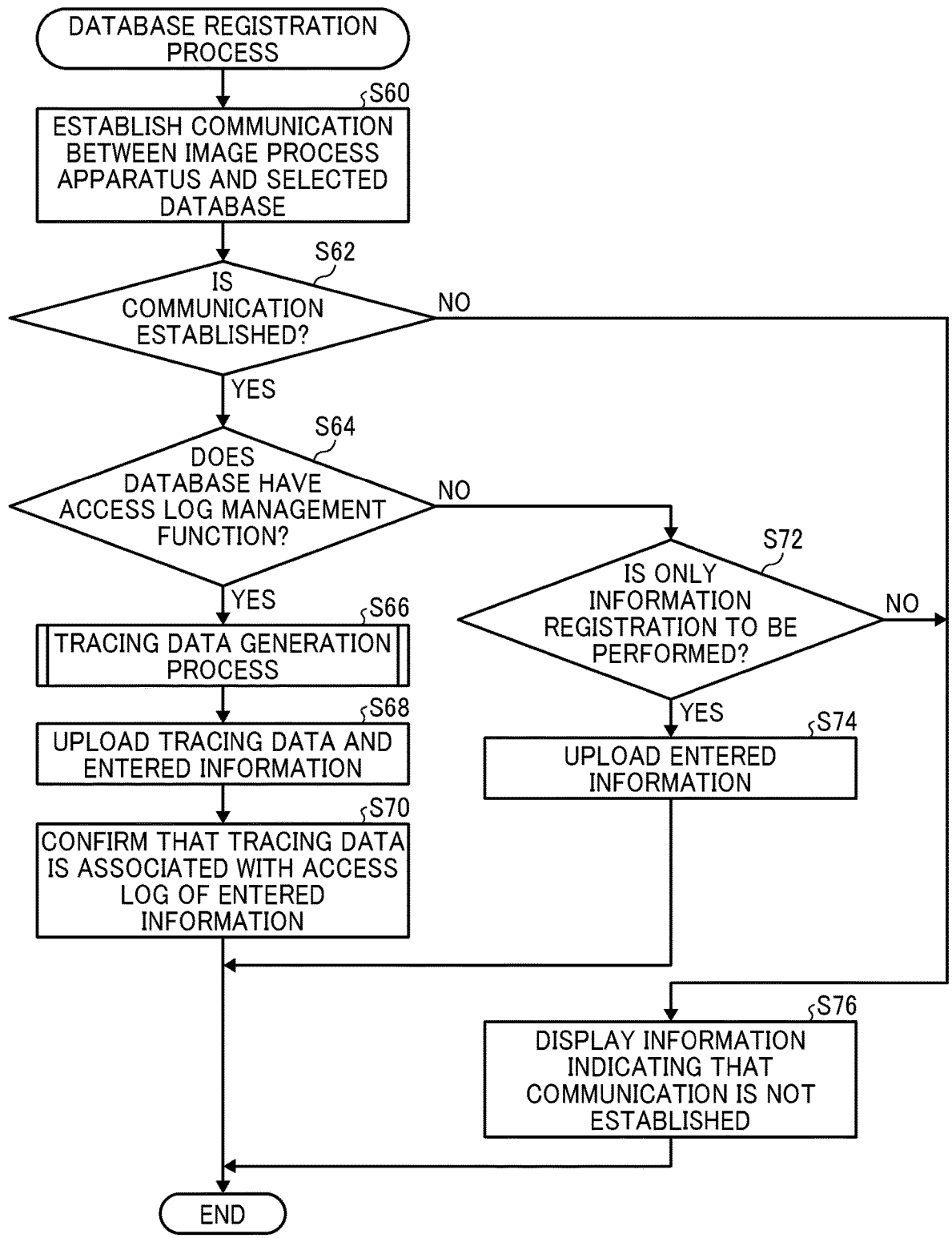
FIG. 21 is a flowchart illustrating steps in a database registration process according to an embodiment of the present disclosure.
Figure 22:
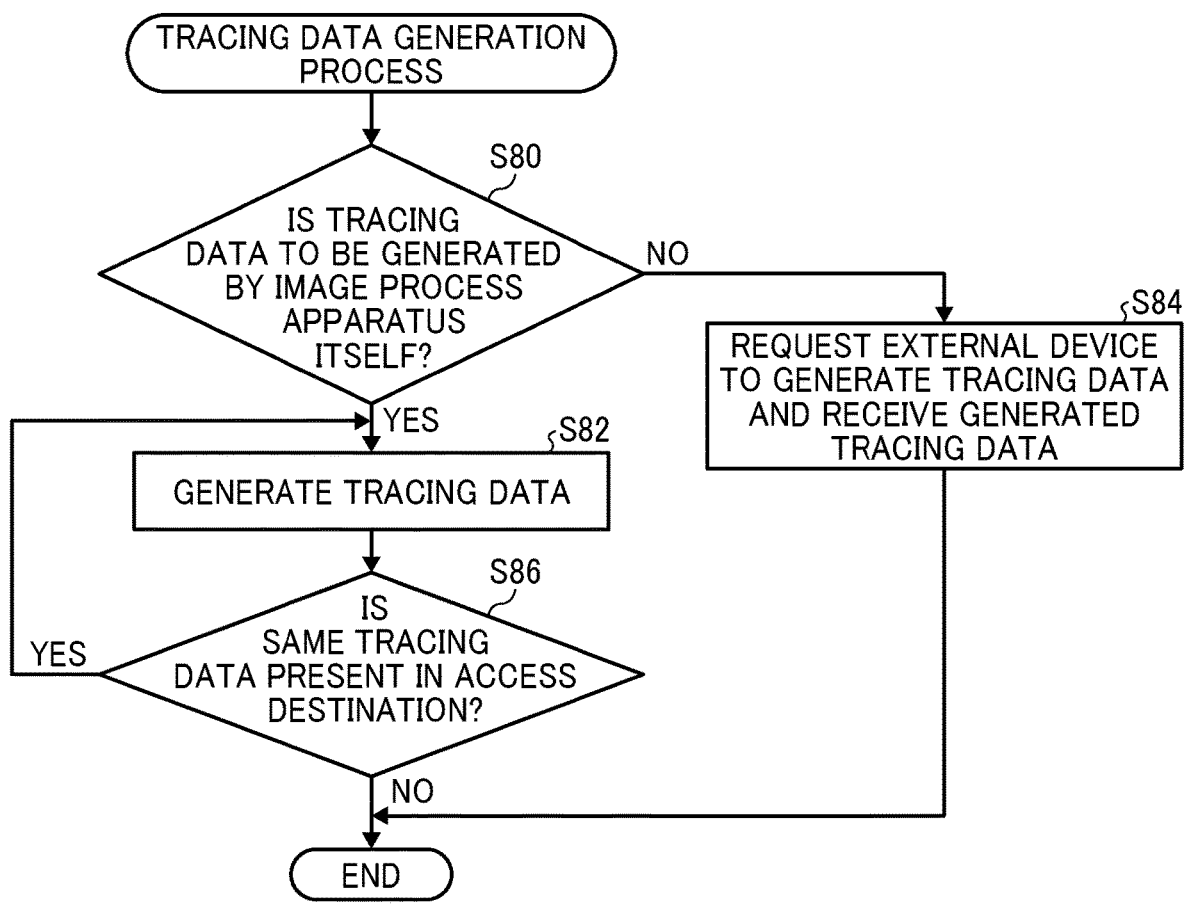
FIG. 22 is a flowchart illustrating steps in a tracing data generation process according to an embodiment of the present disclosure.

Specifically, a series of processes illustrated in the sequence diagram of FIG. 31 is implemented by the processes of S60, S62, and S64 in the flowchart of FIG. 21. It should be noted that, in a case in which the information is registered internally (in the image processing apparatus 24), a series of processes illustrated in the sequence diagram of FIG. 31 is implemented by the process of S90 in the flowchart of FIG. 23.

Figure 32:
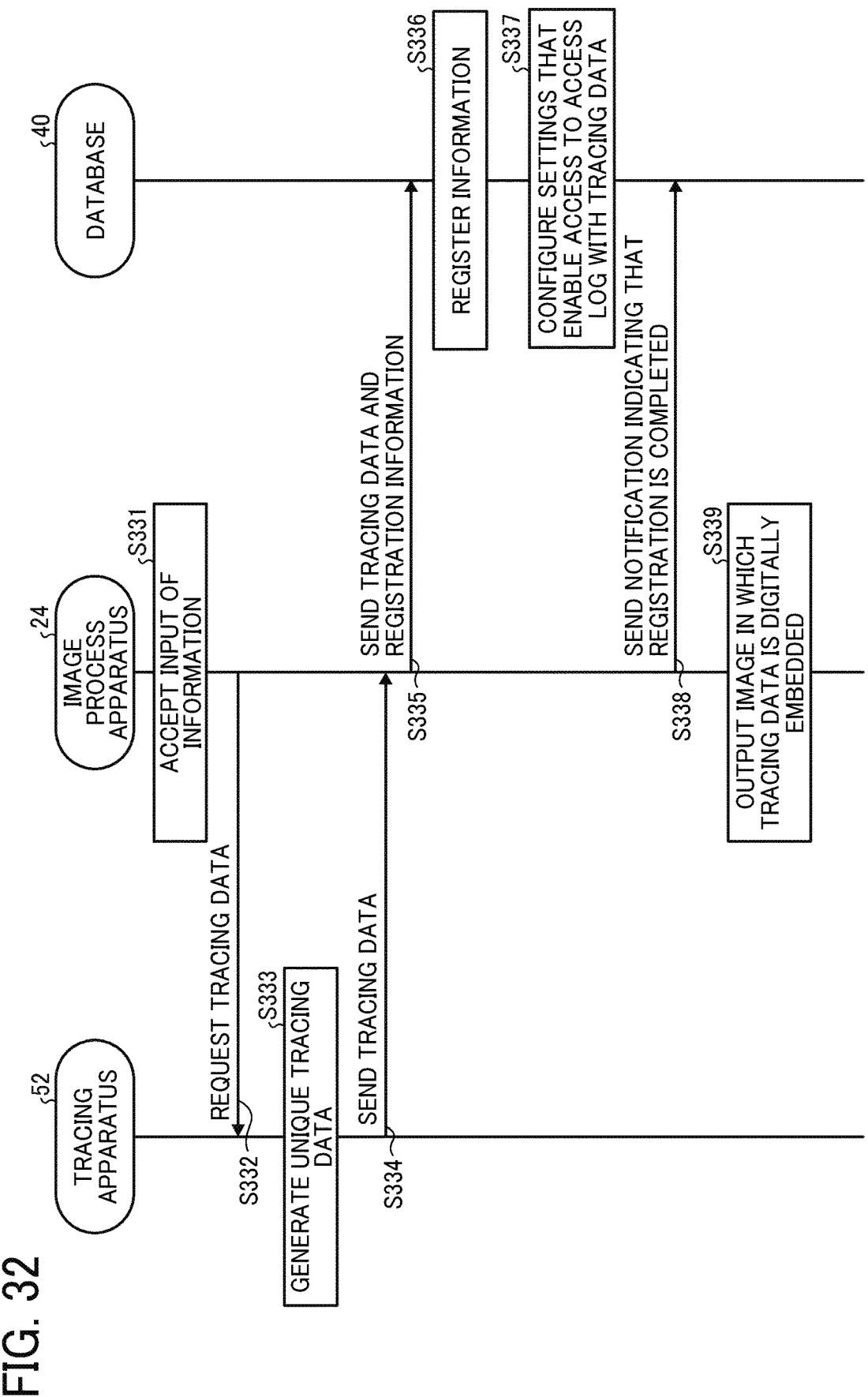
FIG. 32 is a sequence diagram illustrating information flows in an information registration between the image processing apparatus, the database and the tracing apparatus according to an embodiment of the present disclosure.

FIG. 32 is a sequence diagram illustrating information flows in the information registration of S302 in FIG. 30 between the image processing apparatus 24, the database 40 and the tracing apparatus 52.

First, when accepting an input of the information to be registered (S331), the image processing apparatus 24 starts processing for generating tracing data Tc.

Specifically, the image processing apparatus 24 sends, to the tracing apparatus 52, a request for tracing data Tc and information indicating the registration destination (S332).

The tracing apparatus 52 generates unique tracing data Tc, and stores, in the trace table T5, the generated tracing data Tc in association with information indicating the registration destination (S333).

Further, the tracing apparatus 52 sends the generated tracing data Tc to the image processing apparatus 24 (S334).

The image processing apparatus 24 sends, to the database 40, the tracing data Tc and the registration information (S335).

The database 40 performs registration of the information (S336).

Further, the database 40 performs settings so that the access log can be accessed using the tracing data Tc (S337).

The database 40 sends, to the image processing apparatus 24, a notification indicating that the registration of the information is completed (S338).

The image processing apparatus 24 outputs an image containing the tracing data Tc digitally embedded therein (S339).

Specifically, a series of processes illustrated in the sequence diagram of FIG. 32 is implemented by the processes of S40, S44 and S50 in the flowchart of FIG. 19. It should be noted that, in a case in which the information is registered internally (in the image processing apparatus 24), a series of processes illustrated in the sequence diagram of FIG. 32 is implemented by the processes of S40, S46, and S50 in the flowchart of FIG. 19.

Figure 33:
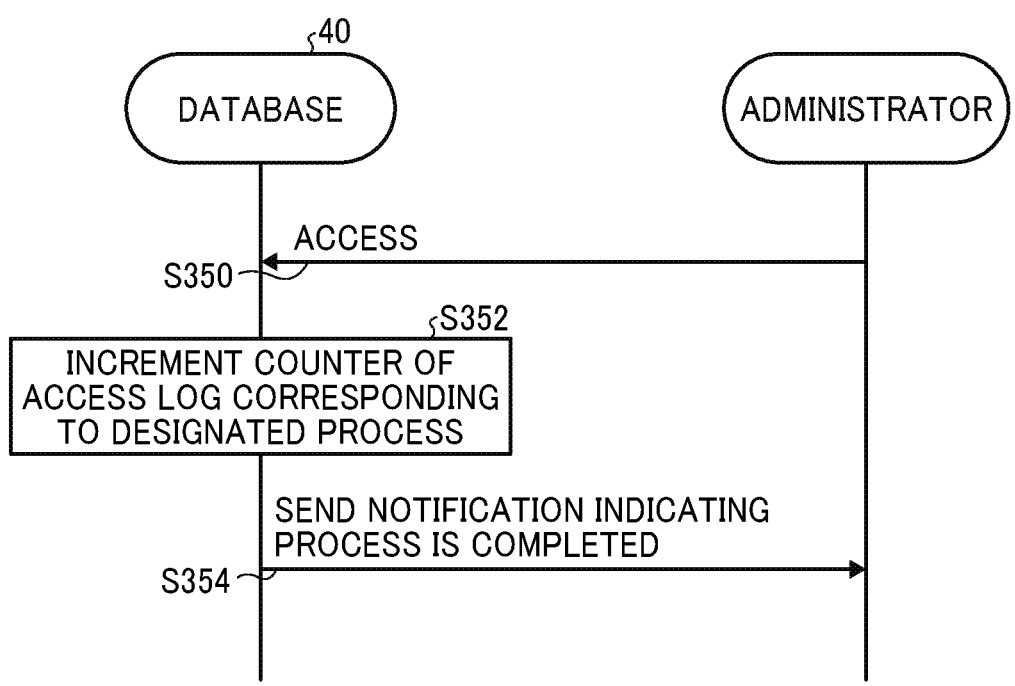
FIG. 33 is a sequence diagram illustrating information flows in access to registered information between the administrator and the database according to an embodiment of the present disclosure.

FIG. 33 is a sequence diagram illustrating information flows in the access to the registered information of S304 in FIG. 30 between the administrator and the database 40.

First, the administrator accesses the database 40 (S350).

The database 40 performs processing designated by the administrator on the registered information, and increments a count corresponding to the performed processing in the access log (S352).

The database 40 sends, to the administrator, a notification indicating that the designated processing is completed (S354).

Specifically, a series of processes illustrated in the sequence diagram of FIG. 33 is implemented by the processes in the flowchart of FIG. 28.

FIG. 34 is a sequence diagram illustrating information flows in the access log acquisition of S306 in FIG. 30 between the image processing apparatus 24, the database 40 and the tracing apparatus 52.

First, the image processing apparatus 24 detects the digitally embedded information (S361).

Further, the image processing apparatus 24 detects the tracing data Tc from the detected digitally embedded information (S362).

Furthermore, the image processing apparatus 24 transmits the tracing data Tc to the tracing apparatus 52 (S363).

The tracing apparatus 52 searches for the access destination (database 40) associated with the received tracing data Tc (S364).

The tracing apparatus 52 transmits the tracing data Tc to the access destination (database 40) associated with the received tracing data Tc (S365).

The database 40 searches for the access log associated with the received tracing data Tc (S366).

The database 40 sends the retrieved access log as the trace result to the tracing apparatus 52 (S367).

The tracing apparatus 52 sends the retrieved access log as the trace result to the image processing apparatus 24 (S368).

The image processing apparatus 24 receives the access log as the trace result, and displays a content of the access log on the operation display unit 2 (S369).

Specifically, a series of processes illustrated in the sequence diagram of FIG. 34 is implemented by the processes of S102 in the flowchart of FIG. 24 and S130 and 132 in the flowchart of FIG. 25.

As described heretofore, in the image processing system 100 according to the present embodiment, the controller 4 of the image processing apparatus 24 generates tracing data Tc used for tracing information (registration information) that is input from the operation display unit 2. The database 40 stores the tracing data Tc together with the input information. Further, the controller 26 of the database 40 associates access authorization to an access log indicating an access history to the registered information with the tracing data Tc. The image output unit 8 of the image processing apparatus 24 outputs an image in which the tracing data Tc and a registration destination of the input information are digitally embedded.

The tracing unit 20 of the image processing apparatus 24 refers to the tracing data Tc and the registration destination in which the input information is registered from the image that is input from the image input unit 6 to acquire a trace result as the access log from the database 40.

The tracing unit 48 of the tracing apparatus 52 refers to an access destination that is associated, in the trace table T5, with the tracing data Tc received from the image processing apparatus 24 to acquire the trace result as the access log from the database 40. The tracing unit 48 of the tracing apparatus 52 generates and stores unique tracing data to be associated with the information of the registration destination in the trace table T5. Accordingly, the tracing unit 48 is able to check whether the tracing data Tc to be associated with the registration information does not overlap with any other tracing data Tc.

The tracing apparatus 52 acquires the trace result from the access destination associated with the trace data Tc, and transfers the trace result to the image processing apparatus 24. The image processing apparatus 24 displays the received trace result on the operation display unit 2. Accordingly, a user who registered the information is able to check whether the registered information has been leaked or there has been unauthorized access to the registered data without bothering an administrator of the information.

Further, in the image processing system 100 according to the present embodiment, the tracing data Tc is digitally embedded in the information being registered. Accordingly, the tracing data Tc is not perceptible to others, and thereby confidentiality is enhanced.

In the present embodiment, the image processing apparatus 24 embeds, in the registration information input by the user, the generated tracing data Tc as digital information such as a digital watermark, and registers, as trace information, the registration information containing the tracing data Tc embedded therein. However, this is just an example. For example, the image processing apparatus 24 may register, as the trace information, the registration information that is input by the user and the generated tracing data Tc.

Further, in the image processing system 100 according to the present embodiment, the database 40 is connected to the image processing apparatus 24 via the communication unit 22 and the communication unit 38. Accordingly, the registered information can be managed at a location different form the image processing apparatus 24. This eliminates restrictions on a location where the image processing system 100 is placed, and thereby convince is enhanced.

Furthermore, in the image processing system 100 according to the present embodiment, the tracing apparatus 52 is connected to the image processing apparatus 24 via the communication unit 22 and the communication unit 50. Still further, the tracing apparatus 52 is connected to the database 40 via the communication unit 38 and the communication unit 50. Accordingly, the tracing apparatus 52 can be placed at a location different form the image processing apparatus 24 and the database 40. This further eliminates restrictions on a location where the image processing system 100 is placed, and thereby convince is enhanced.

Further, according to the present embodiment, the image processing system 100 includes the controller 4 that stores information for causing predetermined processing (P1) to be executed in response to a detection of the tracing data Tc from the information input from the image input unit 6. Accordingly, the trace result can be obtained without any complete procedure.

Although the embodiment is described heretofore, the specific configuration of each apparatus or unit, the specific content of processing, etc., are not limited to the above description.

For example, although a description is given above of an example in which the image processing system 100 is applied to the image processing apparatus 24, the image processing system 100 may be applied in any other suitable manner. In other words, the image processing system 100 according to the disclosure may be applied to a projector, medical instruments, and an image processing apparatus such as a videoconference system. Further, the image processing system 100 according to the disclosure may be applied to communication terminals such as mobile phones, mobile information terminals, and vehicle-installed devices.

In the above description, the image processing apparatus 24 executes the program P1 to function in the controller 4. Alternatively, the image processing apparatus 24 may include a dedicated application specific integrated circuit (ASIC) having substantially the same computation function and control function as the functions performed by instructions of program P1, and cause the functions to operate.

According to an embodiment of the present embodiment, a user who registered information is able to check by him- or herself whether the registered information has been leaked or there has been unauthorized access to the registered data.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image processing system, comprising:
   circuitry to:
   accept, from a user, an input of information to be registered;
   register the information inputted, as registered information including a registration destination;
   generate tracing data, to be used for tracing the registered information, the tracing data to be digitally embedded with the information inputted;
   determine that the tracing data is to be output upon the registered information including an access log management function for managing an access log;
   associate access authorization, to the access log for the registered information, with the tracing data;
   output an image, the image including the tracing data, the registration destination and the access authorization, digitally embedded in the image;
   accept an input of the tracing data;
   acquire the access log associated with the tracing data inputted; and
   display the access log acquired.

2. The image processing system of claim 1, wherein
the circuitry includes first circuitry disposed in a database server and second circuitry disposed in an image processing apparatus, the database server and the image processing apparatus being communicably connected via a network interface,
the first circuitry is configured to register the information inputted, and
the second circuitry is configured to accept the input of the information to be registered.

3. The image processing system of claim 1, wherein
circuitry includes first circuitry disposed in a database server, second circuitry disposed in an image processing apparatus, and third circuitry disposed in a tracing apparatus, the tracing apparatus being communicably connected to the database server and the image processing apparatus via a network interface,
the first circuitry is configured to register the information inputted,
the second circuitry is configured to accept the input of the information to be registered, and
the third circuitry is configured to acquire the access log.

4. The image processing system of claim 1, wherein, in accepting the input of the tracing data, the circuitry is configured to accept an input of information containing the tracing data, and
the circuitry further is configured to activate processing in response to detection of the tracing data from the information containing the tracing data.

5. The image processing system of claim 1, wherein, in acquiring the access log, the circuitry is configured to acquire information indicating a number of times that the registered information has been downloaded.

6. The image processing system of claim 5, wherein the circuitry is further configured to acquire, in acquiring the access log, at least one of information indicating when the registered information was downloaded for each of the number of times, and information indicating a person who downloaded the registered information, for each of the number of times.

7. The image processing system of claim 1, further comprising:
   a display to display a setting screen to accept at least one of settings for registration of the inputted information, settings for acquisition of the access log, and settings for generation of the tracing data.

8. The image processing system of claim 1, further comprising a data registration apparatus to perform data registration.

9. The image processing system of claim 1, further comprising a tracing apparatus.

10. An information processing method performed by an image processing apparatus, the method comprising:
    accepting, from a user, an input of information to be registered;
    registering the information inputted as registered information including a registration destination;
    generating tracing data to be used for tracing the registered information, the tracing data to be digitally embedded with the information inputted;
    determining that the tracing data is to be output upon the registered information including an access log management function for managing an access log;
    associating access authorization, to the access log for the registered information, with the tracing data;
    outputting an image, the image including the tracing data, the registration destination and the access authorization, digitally embedded in the image;
    accepting an input of the tracing data;
    acquiring the access log associated with the tracing data inputted;
    detecting the tracing data in the information inputted; and
    displaying the access log acquired.

11. A non-transitory computer-readable storage medium storing a computer-executable product that causes a computer to perform an information processing method, the method comprising:
    accepting, from a user, an input of information to be registered;
    registering the information inputted as registered information including a registration destination;
    generating tracing data to be used for tracing the registered information, the tracing data to be digitally embedded with the information inputted;
    determining that the tracing data is to be output upon the registered information including an access log management function for managing an access log;
    associating access authorization, to the access log for the registered information with the tracing data;
    outputting an image, the image including the tracing data, the registration destination and the access authorization, digitally embedded in the image;
    accepting an input of the tracing data;
    acquiring the access log associated with the tracing data inputted;
    detecting the tracing data in the information inputted; and
    displaying the access log acquired.

12. The image processing method of claim 10, wherein, the acquiring of the access log includes acquiring information indicating a number of times that the registered information has been downloaded.

13. The image processing method of claim 12, wherein the acquiring of the access log includes at least one of
information indicating when the registered information was downloaded for each of the number of times, and
information indicating a person who downloaded the registered information downloaded, for each of the number of times.

14. The image processing method of claim 10, further comprising:
displaying a setting screen to accept at least one of settings for registration of the inputted information, settings for acquisition of the access log, and settings for generation of the tracing data.

15. The non-transitory computer-readable storage medium of claim 11, wherein, the acquiring of the access log includes acquiring information indicating a number of times that the registered information has been downloaded.

16. The non-transitory computer-readable storage medium of claim 15, wherein the acquiring of the access log includes at least one of
information indicating when the registered information was downloaded for each of the number of times, and
information indicating a person who downloaded the registered information downloaded, for each of the number of times.

17. The image processing system of claim 1, wherein the circuitry is further configured to:
detect, after the image is output, contents embedded in the image; and
display the tracing data based upon the contents detected.

18. The image processing system of claim 17, wherein the circuitry is further configured to:
acquire the tracing data based upon the contents detected and thereafter, acquire the access log.

19. The image processing method of claim 10, further comprising:
detecting, after the image is output, contents embedded in the image; and
displaying the tracing data based upon the contents detected.

20. The image processing method of claim 19, further comprising:
acquiring the tracing data based upon the contents detected and thereafter, acquiring the access log.

* * * * *